(12) United States Patent
Han et al.

(10) Patent No.: US 12,174,339 B2
(45) Date of Patent: Dec. 24, 2024

(54) META-LENS, IMAGING OPTICS, AND ELECTRONIC DEVICE INCLUDING THE SAME

(71) Applicant: SAMSUNG ELECTRONICS CO., LTD., Suwon-si (KR)

(72) Inventors: Seunghoon Han, Seoul (KR); Hyunsung Park, Suwon-si (KR); Hyeonsoo Park, Seoul (KR); Kideok Bae, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 17/879,546

(22) Filed: Aug. 2, 2022

(65) Prior Publication Data

US 2023/0044716 A1 Feb. 9, 2023

Related U.S. Application Data

(60) Provisional application No. 63/228,861, filed on Aug. 3, 2021.

(30) Foreign Application Priority Data

May 20, 2022 (KR) .......................... 10-2022-0062317

(51) Int. Cl.
    *G02B 1/00* (2006.01)
(52) U.S. Cl.
    CPC ........ *G02B 1/007* (2013.01); *G02B 2207/101* (2013.01)

(58) Field of Classification Search
    CPC .............. G02B 1/007; G02B 2207/101; G02B 5/1876; G02B 5/008; G02B 1/002;
    (Continued)

(56) References Cited

U.S. PATENT DOCUMENTS

2004/0131004 A1* 7/2004 Mimori ................ G11B 7/1376
2016/0299337 A1* 10/2016 Arbabi ................. G02B 5/0294
(Continued)

FOREIGN PATENT DOCUMENTS

KR 10-2021-0042005 A 4/2021
KR 10-2021-0052177 A 5/2021

OTHER PUBLICATIONS

Gordon Wetzstein et al, "Inference in artificial intelligence with deep optics and photonics", Nature, vol. 588, Dec. 3, 2020, 9 pages.
(Continued)

*Primary Examiner* — Jonathan Y Jung
(74) *Attorney, Agent, or Firm* — Sughrue Mion, PLLC

(57) ABSTRACT

A meta-lens, an imaging optics, and an electronic device including the imaging optics are provided. The meta-lens includes at least one meta-layer having a plurality of nano-structures with a less shape dimension than an operating wavelength, modulates a phase and intensity of incident light, and forms a plurality of spots of different brightness on an imaging plane in an asymmetric distribution. The plurality of spots formed on the imaging plane include a main spot and at least one sub-spot that is separated from a center of the main spot and has lower illuminance than the main spot.

19 Claims, 23 Drawing Sheets

(58) Field of Classification Search
CPC ...... G02B 26/06; G02B 1/005; G02B 5/1809; G02F 1/292; G02F 2202/30
See application file for complete search history.

(56) References Cited

U.S. PATENT DOCUMENTS

| | | |
|---|---|---|
| 2016/0316180 A1 | 10/2016 | Han et al. |
| 2017/0212285 A1* | 7/2017 | Arbabi .................. G02B 1/002 |
| 2017/0356621 A1* | 12/2017 | Meyers ..................... F21K 9/90 |
| 2020/0174163 A1* | 6/2020 | Han ...................... G02B 1/002 |
| 2020/0225386 A1 | 7/2020 | Tsai et al. |
| 2021/0103075 A1 | 4/2021 | Park et al. |
| 2021/0132256 A1 | 5/2021 | Park et al. |
| 2021/0312596 A1* | 10/2021 | Hagiwara ................ G06T 5/50 |
| 2023/0387165 A1* | 11/2023 | Miyata ............... H01L 27/1464 |

OTHER PUBLICATIONS

Christopher A. Metzler et al, "Deep Optics for Single-shot High-dynamic-range Imaging", CVPR, 2020, 11 pages.
G. W. Forbes, "Shape specification for axially symmetric optical surfaces", Opt. Express, vol. 15, No. 8, Apr. 13, 2007, 9 pages.
G. W. Forbes, "Manufacturability estimates for optical surfaces", Opt. Express, vol. 19, No. 10, May 5, 2011, 19 pages.
Shane Colburn et al, "Metasurface Generation of Paired Accelerating and Rotating Optical Beams for Passive Ranging and Scene Reconstruction", ACS Photonics 2020, vol. 7, May 22, 2020, pp. 1529-1536.

* cited by examiner

META-LENS, IMAGING OPTICS, AND ELECTRONIC DEVICE INCLUDING THE SAME

CROSS-REFERENCE TO RELATED APPLICATIONS

This application claims priority to Korean Patent Application No. 10-2022-0062317, filed on May 20, 2022, in the Korean Intellectual Property Office, and claims the benefit of U.S. Provisional Application No. 63/228,861, filed on Aug. 3, 2021, in the United States Patent Office, the disclosures of which are incorporated herein in their entireties by reference.

BACKGROUND

1. Field

The disclosure relates to a meta-lens, an imaging optics, and an electronic device including the same.

2. Description of the Related Art

A complementary metal-oxide semiconductor (CMOS) image sensor or so on is used to capture an image or a video. The limitation of a dynamic range of an image sensor is determined by the full well capacity of a pixel itself. In order to overcome the limitation of the dynamic range of the image sensor, multiple images are captured at different exposure times within a single frame time and synthesized to obtain a high dynamic range (HDR) image. Motion artifacts are generated in the image obtained in this way.

SUMMARY

Provided are a meta-lens capable of acquiring a high dynamic range image without motion artifacts and applicable to acquiring depth position information on an object having various reflectance, an imaging optics including the meta-lens, and an electronic device including the imaging optics.

Additional aspects will be set forth in part in the description which follows and, in part, will be apparent from the description, or may be learned by practice of the presented embodiments of the disclosure.

According to an aspect of the disclosure, there is provided a meta-lens including: at least one meta-layer having a plurality of nanostructures, each of the plurality of nanostructures having a dimension less than an operating wavelength, wherein the plurality of nanostructures are configured to modulate a phase and intensity of incident light to form a plurality of spots of different brightness on an imaging plane in an asymmetric distribution, wherein the plurality of spots formed on the imaging plane include a first spot and at least one second spot that is separated from a center of the first spot, wherein the second spot has lower illuminance than the first spot.

The at least one second spot may include a plurality of second spot that have different illuminances and are asymmetrically distributed with respect to the first spot.

The at least one second spot may include a first second spot having a less brightness peak value than the first spot by about 4 dB to about 10 dB.

The at least one second spot may further include a second second spot, the first second spot and the second second spot are asymmetrically distributed with respect to the first spot, and a brightness peak value of the second second spot is less than a brightness peak value of the first second spot by about 4 dB to about 10 dB.

The meta-lens has a complex amplitude transmittance T(r) satisfying the following equation, $$T(\vec{r}) \propto \left\{1 + \sum_{i}^{n} A_i \exp\left(jk\vec{v_i} \cdot \vec{r}\right)\right\} \times T_0(\vec{r})$$

wherein $T_0(r)$ represents a transmittance of a main ray forming the main spot, $A_i$ represents relative transmission amplitude of a sub-ray forming an i-th second spot with respect to the first spot, and $v_i$ represents a direction cosine corresponding to a tilt degree of a propagation direction of the sub-ray, and wherein $v_i=u_i/f$, wherein $u_i$ is a distance between the first spot and the i-th second spot on the imaging plane, and f is an effective focal length of the meta-lens.

The meta-lens may further include a transmittance-changing layer, which is provided to branch a sub-ray forming the at least one second spot to be tilted with respect to a main ray forming the first spot and modulate intensity of light transmitting therethrough to form the plurality of spots of different brightness on the imaging plane in an asymmetric distribution, and wherein the at least one meta-layer is further configured to modulate a phase of light transmitting through the at least one meta-layer, and.

The transmittance-changing layer may be provided on an upper portion of the at least one meta-layer or a lower portion of the at least one meta-layer.

The transmittance-changing layer may include a high energy beam sensitive (HEBS) material layer.

The at least one meta-layer may include a first layer including a plurality of first nanostructures and a first peripheral material surrounding the plurality of first nanostructures, and a second layer including a plurality of second nanostructures and a second peripheral material surrounding the plurality of second nanostructures, the second layer being arranged on the first layer, and wherein a refractive index of the first nanostructure is greater than a refractive index of the first peripheral material, and a refractive index of the second nanostructure is less than a refractive index of the second peripheral material, or a refractive index of the first nanostructure is less than a refractive index of the first peripheral material, and a refractive index of the second nanostructure is greater than a refractive index of the second peripheral material, thereby forming a same phase transmittance profile for at least two different wavelengths included in incident light.

The at least one meta-layer may include a first layer including a plurality of first nanostructures and a first peripheral material surrounding the plurality of first nanostructures, and a second layer including a plurality of second nanostructures and a second peripheral material surrounding the plurality of second nanostructures, the second layer being arranged on the first layer, and the at least one meta-layer includes a first zone in which signs of change rates of an effective refractive index depending on positions are same as each other in the first layer and the second layer, and a second zone in which the signs are opposite to each other in the first layer and the second layer, thereby forming phase transmittance profiles that monotonically change for at least two different wavelengths and have different phase modulation ranges.

The first zone is wider than the second zone, wherein the first zone comprises a plurality of first zones and the second zone comprises a plurality of second zones, and wherein the first zone and the second zone are alternately arranged in one direction.

The meta-lens may be provided to form a complex amplitude transmittance distribution having a smaller number of carrier spatial frequency components than a number of the plurality of spots at an output end.

The plurality of nanostructures may be arranged to add a spherical or aspherical transmission phase distribution to a phase distribution having the carrier spatial frequency component.

A period of the complex amplitude transmittance distribution is three times or more an operating wavelength.

According to another aspect of the disclosure, there is provided an imaging optics including: a plurality of lenses including a meta-lens, wherein the meta-lens includes at least one meta-layer having a plurality of nanostructures, each of the plurality of nanostructures having a dimension less than an operating wavelength, wherein the plurality of nanostructures are configured to modulate a phase and intensity of incident light to form a plurality of spots of different brightness on an imaging plane in an asymmetric distribution, wherein the plurality of spots formed on the imaging plane include a first spot and at least one second spot that is separated from a center of the first spot, and wherein the second spot has lower illuminance than the first spot.

The plurality of lenses may include at least one refractive lens, wherein the meta-lens is at least one of a front end, an intermediate portion, or a last end of the imaging optics, wherein the at least one refractive lens includes a first lens having a positive refractive power with respect to incident light from an object side and having a convex surface toward the object side, and wherein the meta-lens has negative chromatic aberration with respect to the incident light passing through the first lens.

The meta-lens may form a phase transmittance profile to have a positive refractive power or a negative refractive power.

According to another aspect of the disclosure, there is provided an electronic device including: an imaging optical element; and an image sensor configured to convert optical images of a plurality of spots of different brightness formed in an asymmetric distribution by the imaging optical element into electrical signals, wherein the imaging optical element includes a plurality of lenses including a meta-lens, wherein the meta-lens includes at least one meta-layer having a plurality of nanostructures, each of the plurality of nanostructures having a dimension less than an operating wavelength, wherein the plurality of nanostructures are configured to modulate a phase and intensity of incident light to form the plurality of spots of different brightness on an imaging plane in an asymmetric distribution, wherein the plurality of spots formed on the imaging plane include a first spot and at least one second spot that is separated from a center of the first spot, and wherein the second spot has lower illuminance than the first spot.

The electronic device may further include an image signal processor configured to process an image signal detected by the image sensor to deconvolute an imaging focus shape of the imaging optics in single shot and configured to obtain an image with a high contrast ratio.

The plurality of lenses may include at least one refractive lens, wherein the meta-lens is at least one of a front end, an intermediate portion, or a last end of the imaging optics, wherein the at least one refractive lens includes a first lens having a positive refractive power with respect to incident light from an object side and having a convex surface toward the object side, and wherein the meta-lens has negative chromatic aberration with respect to the incident light passing through the first lens.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
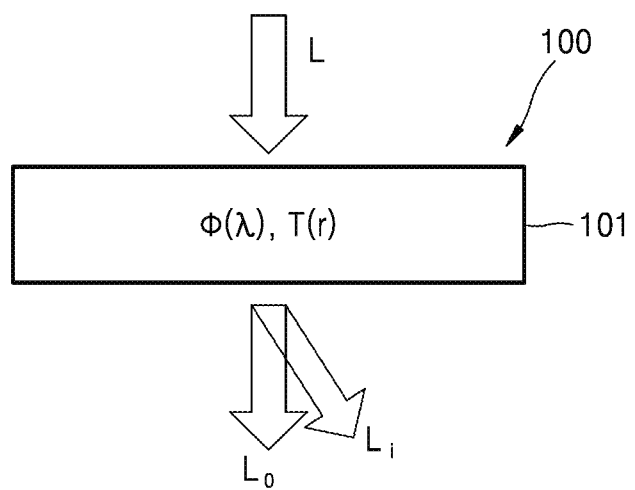
FIGS. 1 and 2 schematically illustrate a meta-lens according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings. In the following drawings, the same reference numerals refer to the same components, and a size of each component in the drawings may be exaggerated for the sake of clear and convenient description. In addition, the following embodiments to be described are merely examples, and various modifications may be made from the example embodiments.

Hereinafter, what is described as "upper portion" or "on or upper" may also include not only components directly thereon, thereunder, on the left, and on the right in contact therewith but also components thereon, thereunder, on the left, and on the right without being in contact therewith. Singular expressions include plural expressions unless the context clearly indicates otherwise. In addition, when a portion "includes" a certain component, this means that other components may be further included rather than excluding other components unless specifically stated to the contrary.

Use of a term "the" and similar reference terms may correspond to both the singular and the plural. Steps constituting a method may be performed in any suitable order unless there is a clear statement that the steps should be performed in the order described or contrary to the order and are not limited thereto.

In addition, terms such as " . . . unit", " . . . portion", and "module" described in the specification mean units that process at least one function or operation, which may be implemented as hardware or software, or as a combination of hardware and software.

Connection or connection members of lines between configuration elements illustrated in the drawings exemplarily represent functional connections and/or physical or circuit connections and may be represented as alternative or additional various functional connections, physical connections, or circuit connections in an actual apparatus.

Use of all examples or all example terms is merely for describing technical ideas in detail, and the scope of claims is not limited by the examples or the example terms unless limited by the claims.

In order for a camera or image sensor to have high dynamic range (HDR) performance of the human eye and beyond, there is a need for development of the best integration of an optical system, a sensor, and an algorithm. A meta-lens according to an example embodiment forms a plurality of spots of different brightness in a preset distribution, for example, in an asymmetric distribution, on an imaging plane. To this end, the meta-lens according to the example embodiment includes at least one meta-layer having a plurality of nanostructures having a shape dimension less than an operating wavelength. In addition, the meta-lens according to the example embodiment is provided to modulate the phase and intensity of light. Here, the asymmetric distribution may include positional asymmetry of the plurality of spots and/or asymmetry of brightness peak values.

The meta-lens according to the example embodiment may form a phase transmittance distribution serving as a lens by an arrangement of a plurality of nanostructures, and has a point spread function (PSF) form such that a complex amplitude transmittance distribution of light at an output end has at least one carrier spatial frequency (hereinafter, referred to as a spatial frequency) to form a plurality of spots when applied to an imaging optical system, and a plurality of spots having different brightness may be formed on an imaging plane, for example, in an asymmetric distribution. In this case, the arrangement of a plurality of nanostructures may be provided to form the same phase transmittance profile or phase transmittance profiles having different phase modulation ranges while monotonically changing for at least two different wavelengths. In addition, the meta-lens according to the example embodiment may be provided such that a spatial frequency component for forming a plurality of spots on an imaging plane is less than or equal to the total number of spots-1 of a PSF.

A plurality of spots with different brightness peak values in an asymmetric distribution are formed on an imaging plane of the meta-lens, and in this case, the plurality of spots may include a main spot and at least one sub-spot which is separated from the center of the main spot and has lower illuminance than the main spot. In this case, the at least one sub-spot may include, for example, a plurality of sub-spots of different illuminances, which are distributed, for example, asymmetrically with respect to the main spot. For example, the at least one sub-spot may include a first sub-spot and a second sub-spot asymmetrically distributed with respect to the main spot. In this case, the first sub-spot and the second sub-spot may have different brightness peak values.

For example, a meta-layer may be provided to have an arrangement of a plurality of nanostructures that modulate a phase and intensity of light transmitting therethrough, and thus, the meta-lens according to the example embodiment may form a plurality of spots of different brightness in an asymmetric distribution on an imaging plane. In another example, the meta-lens according to the example embodiment may include a meta-layer in which a plurality of nanostructures are arranged to modulate a phase of light transmitting therethrough, and a transmittance-changing layer that modulates the intensity of light transmitting therethrough to form a plurality of spots of different brightness in an asymmetric distribution on an imaging plane. In this case, the transmittance-changing layer may be provided on an upper or lower portion of the meta-layer such that transmittance is spatially changed The meta-layer and the transmission changing layer may have a stacked structure or may be provided as separate members.

In the meta-lens according to the example embodiment, a plurality of spots of different brightness may be formed on an imaging plane in an asymmetric distribution, and the plurality of spots may include a main spot and at least one sub-spot of which the center is separated from the center of the main spot and which has lower illuminance than the main spot and may be formed on an imaging plane.

When the meta-lens according to the example embodiment is applied to an imaging optics, an imaging plane, in which a plurality of spots are formed in an asymmetric distribution, may correspond to an imaging plane of the imaging optics. For example, in an electronic device including an imaging optics and an image sensor, for example, a camera or a device including the camera, an image sensor is at or near an imaging plane of the imaging optics, and a plurality of spots formed by the meta-lens according to the example embodiment and an imaging optics, to which the meta-lens is applied, may be formed on a sensing surface of the image sensor.

An image acquisition device, such as a camera in which the meta-lens according to the example embodiment is applied to an imaging optics, may deconvolute an imaging focus shape of an imaging optics, that is, a PSF for a single shot image and may obtain an HDR image by performing image signal processing. Accordingly, the meta-lens according to the example embodiment may increase optical performance such that a camera or various image-based sensors operate in an HDR.

Figure 2:
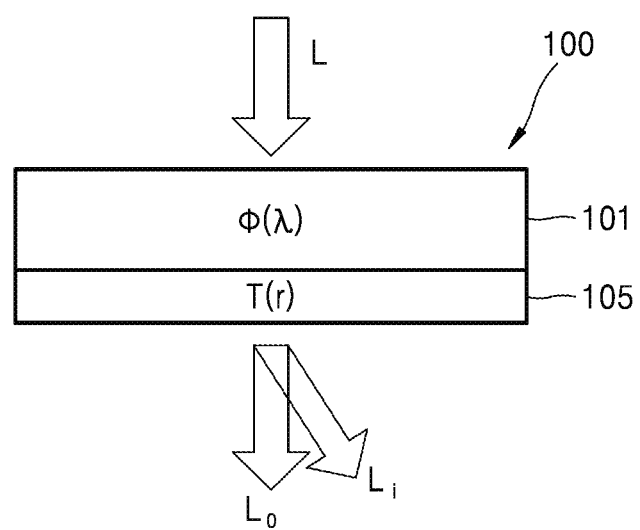

FIGS. 1 and 2 schematically illustrate a meta-lens 100 according to an example embodiment.

Referring to FIGS. 1 and 2, the meta-lens 100 according to the example embodiment may include at least one meta-layer 101 including a plurality of nanostructures having a dimension less than an operating wavelength and may be provided to modulate a phase and intensity of incident light L. According to an example, the plurality of nanostructures may be cylindrical in shape, in which case, the diameter the plurality of nanostructures may be less than the operating wavelength. According to another example, the plurality of nanostructures may have a rectangular or square cross-section (i.e., cuboid in shape), in which case, the width the plurality of nanostructures may be less than the operating wavelength. The meta-lens 100 according to the example embodiment may be provided to generate a phase transmittance profile representing a refractive power, have a PSF form in which a complex amplitude transmittance distribution of light at an output end has at least one spatial frequency (a period in a constant direction in a space), and form a plurality of spots of different brightness in an asymmetric distribution on an imaging plane. The plurality of spots formed on the imaging plane by the meta-lens 100 according to the example embodiment may include a main spot SPm and at least one sub-spot separated from the center of the main spot and having a lower illuminance than the main spot SPm. In FIGS. 1 and 2, $L_0$ denotes a main ray that forms the main spot SPm on an imaging plane, and $L_i$ denotes a sub-ray that forms an i-th sub-spot on an imaging plane. A propagation direction of the sub-ray $L_i$ may form an angle with the main ray $L_0$.

Here, the imaging plane may correspond to an imaging plane of the meta-lens 100 according to the example embodiment or may correspond to an imaging plane of an imaging optics, to which the meta-lens 100 according to the example embodiment is applied. The number of spatial frequency components for forming a plurality of spots on an imaging plane of the meta-lens 100 according to the example embodiment may be less than or equal to the total number of spots-1 of a PSF.

Figure 3:
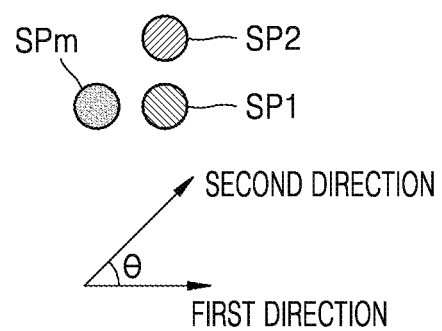
FIG. 3 illustrates an example of an asymmetric distribution of a plurality of spots formed on an imaging plane by a meta-lens according to an example embodiment.

The plurality of spots formed on the imaging plane by the meta-lens 100 according to the example embodiment may include the main spot SPm and at least one sub-spot that is separated from the center of the main spot SPm and has lower illuminance than the main spot SPm, as illustrated in FIG. 3 as an example. The at least one sub-spot may include a plurality of sub-spots, which have different illuminances from each other and are asymmetrically distributed with respect to the main spot SPm, for example, a first sub-spot SP1 and a second sub-spot SP2.

FIG. 3 illustrates an example in which, the plurality of sub-spots, for example, the first sub-spot SP1 and the second sub-spot SP2, are formed to have different brightness peak values by the meta-lens 100 according to the example embodiment and thus are formed in an asymmetric distribution in brightness peak value with respect to the main spot SPm and are also positionally formed in an asymmetric distribution. Here, a positional asymmetry may include that the first sub-spot SP1 and the second sub-spot SP2 are opposite to each other with respect to the main spot SPm and have different separation distances from the main spot SPm.

In another example, the meta-lens 100 according to the example embodiment may be provided to form the plurality of spots, for example, the first sub-spot SP1 and the second sub-spot SP2, to be positionally symmetric with respect to the main spot SPm and to form only brightness peak values with different asymmetric distributions. Positional symmetry may include that the first sub-spot SP1 and the second sub-spot SP2 are opposite to each other with respect to the main spot SPm and have the same separation distance.

As described above, the meta-lens 100 according to the example embodiment may be provided such that a plurality of spots with different brightness peak values are formed in an asymmetric distribution on an imaging plane, and the plurality of spots formed on the imaging plane form the main spot SPm and at least one sub-spot separated from the center of the main spot SPm and having lower illuminance than the main spot SPm. In addition, the at least one sub-spot may include a plurality of sub-spots with different brightness peak values, for example, the first sub-spot SP1 and the second sub-spot SP2. In this case, forming a plurality of spots with different brightness peak values in an asymmetric distribution on an imaging plane, by the meta-lens 100 according to the example embodiment may include positional asymmetry of the plurality of spots and/or asymmetry of brightness peak values of the plurality of spots. As such, according to the meta-lens 100 of the example embodiment, for example, the first sub-spot SP1 and the second sub-spot SP2, may be formed in an asymmetric distribution with respect to the main spot SPm in various ways. Hereinafter, the meta-lens 100, in which at least one sub-spot includes the first sub-spot SP1 and the second sub-spot SP2 with different brightness peak values and the first sub-spot SP1 and the second sub-spot SP2 are positionally formed in an asymmetric distribution with respect to the main spot SPm, is described as an example, but the example embodiment is not limited thereto.

Moreover, a brightness peak value of at least one sub-spot formed on an imaging plane by the meta-lens 100 according to the example embodiment may be lowered by about 4 dB to about 10 dB, compared to a brightness peak value of, for example, the main spot SPm. For example, the at least one sub-spot may include the first sub-spot SP1 having a less brightness peak value than the main spot SPm by about 4 dB to about 10 dB. In addition, the at least one sub-spot may further include the second sub-spot SP2, and the second sub-spot SP2 may have a less brightness peak value than the first sub-spot SP1 by about 4 dB to about 10 dB. For example, assuming that the brightness peak value of the main spot SPm is about 0 dB, the first sub-spot SP1 may be formed to have a brightness peak value of about −10 dB to about −4 dB, for example, about −6 dB, and the second sub-spot SP2 may be formed to have a brightness peak value of about −20 dB to about −8 dB, for example, about −12 dB.

In addition, the PSF of the meta-lens 100 according to the example embodiment may have chromatic aberration. Relative positions of a PSF between wavelengths and a degree of spread of the PSF around the main spot SPm, which is a focal spot of the main ray for each wavelength, may be different from each other change depending on, for example, wavelength and. Therefore, on an imaging plane of the meta-lens 100 according to the example embodiment, a separation distance between the first sub-spot SP1 and the second sub-spot SP2 with respect to the main spot SPm may change depending on degrees of chromatic aberration of the meta-lens 100 or an imaging optics including the meta-lens 100.

The number of sub-spots formed in an asymmetric distribution with respect to the main spot SPm may change depending on the number of spatial frequencies of the meta-lens 100. As illustrated in FIG. 3, the first sub-spot SP1 may be distributed in a first direction, for example, a horizontal direction, with respect to the main spot SPm, and the second sub-spot SP2 may be distributed in a second direction, for example, a direction forming an angle θ with respect to the first direction. In another example, the meta-lens 100 according to the example embodiment may also be provided to form a main spot SPm and one sub-spot or three or more sub-spots that are asymmetrically distributed with respect to the main spot SPm on the imaging plane and have different brightness peak values.

The meta-lens 100 according to the example embodiment may be provided to have a complex amplitude transmittance T(r) that satisfies Equation 1, for example, so that a complex amplitude transmittance distribution of light at an output end has at least one spatial frequency and thus a plurality of spots of different brightness are formed in an asymmetric distribution on an imaging plane.

$$T(\vec{r}) \propto \left\{ 1 + \sum_{i}^{n} A_i \exp\left(jk\vec{v_i} \cdot \vec{r}\right) \right\} \times T_0(\vec{r}) \quad \text{Equation 1}$$

In Equation 1, $T_0(r)$ is transmittance of the meta-lens 100 for the main ray $L_0$ forming the main spot SPm, $A_i$ represents relative transmission amplitude of a sub-rays $L_i$ forming an i-th sub-spot with respect to the main spot SPm, and $v_i$ represents a direction cosine corresponding to tilt of a propagation direction of the sub-ray. Here, $v_i=u_i/f$, $u_i$ is a distance between the main spot SPm and the i-th sub-spot on an imaging plane, and f is an effective focal length of an imaging optics including the meta-lens 100.

Figure 4A:
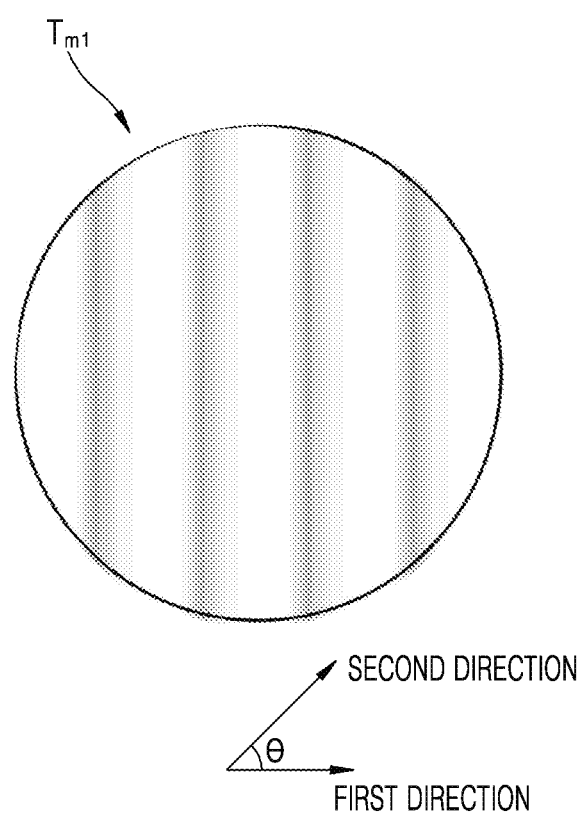
FIG. 4A illustrates an example of a first transmission amplitude distribution for forming a first sub-spot of first illuminance lower than illuminance of a main spot.
Figure 4B:
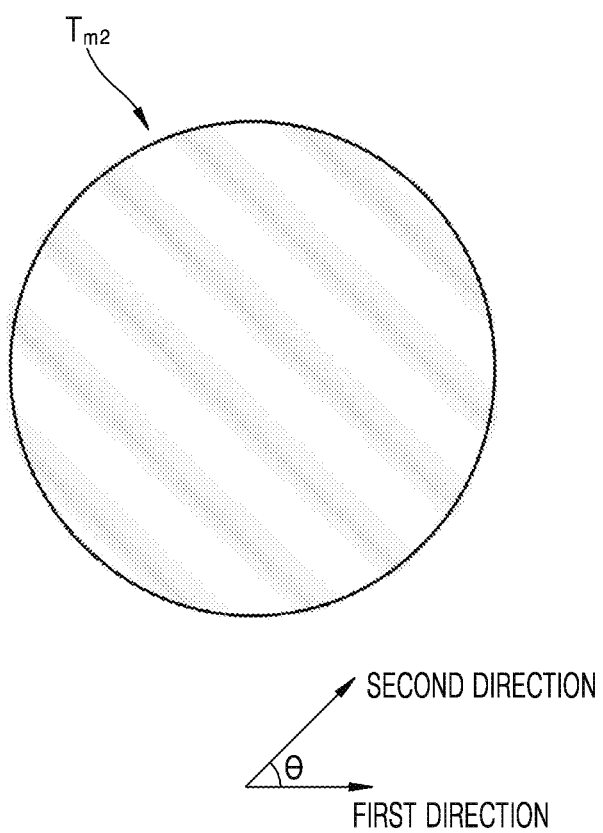
FIG. 4B illustrates an example of a second transmission amplitude distribution for forming a second sub-spot of second illuminance lower than the illuminance of the first spot.

For example, in order to further form the first sub-spot SP1 in a first direction, for example, the horizontal direction with respect to the main spot SPm, the meta-lens 100 may be provided to add a weak transmission amplitude modulation distribution, for example, a first transmission amplitude distribution $T_{m1}$ illustrated in FIG. 4A to $T_0(r)$. In addition, in order to further form the second sub-spot SP2 in a second direction, the meta-lens 100 may further include a weak transmission amplitude modulation distribution illustrated in FIG. 4B, for example, a second transmission amplitude distribution $T_{m2}$. FIG. 4A illustrates an example of the first transmission amplitude distribution $T_{m1}$ for forming the first sub-spot SP1 of first illuminance lower than illuminance of the main spot SPm. FIG. 4B illustrates an example of the second transmission amplitude distribution $T_{m2}$ for forming the second sub-spot SP2 of second illuminance lower than the illuminance of the first spot SP1.

The meta-lens 100 according to the example embodiment may be provided to have a complex amplitude transmittance obtained by adding a transmission phase distribution for each focal component, that is, a transmission phase distribution for forming the first sub-spot SP1 and the second sub-spot SP2, to a transmission phase distribution for forming the main spot SPm of a main ray as a complex function as in Equation 1. That is, according to the meta-lens 100 of the example embodiment, a transmission phase may be modulated according to a spatial frequency direction for each additional focal component, similar to the transmission amplitude distribution.

As such, the meta-lens 100 according to the example embodiment may be provided to have a smaller number of spatial frequency components than the number of spots. That is, when a PSF of the meta-lens 100 according to the example embodiment has N focal spots, and N spots including the main spot SPm and N−1 sub-spots in an asymmetric distribution are formed on an imaging plane (here, N is a natural number of 2 or more), the meta-lens 100 according to the example embodiment may be provided to have N−1 or less spatial frequency components. In addition, the meta-lens 100 according to the example embodiment may be provided such that a period of the complex amplitude transmittance distribution having the spatial frequency is about three times or more of an operating wavelength. For example, transmission amplitude distributions $T_{m1}$ and $T_{m2}$ of FIGS. 4A and 4B may be provided such that brightness modulation is performed at intervals of about three times or more of the operating wavelength, for example, about 10 to about 20 times of the operating wavelength.

According to the meta-lens 100 of the example embodiment, a meta-layer 101 may be provided to delay a phase φ(λ) of light passing therethrough to generate a phase transmittance profile and to modulate the transmittance T(r) of light as illustrated in FIG. 1. The meta-layer 101 may be provided to form a phase transmittance profile by delaying the phase φ(λ) of light passing therethrough according to a refractive index distribution formed by an arrangement of the plurality of nanostructures and modulate the transmittance T(r) of light such that the complex amplitude transmittance distribution of light at an output end has at least one spatial frequency.

That is, the meta-lens 100 according to the example embodiment may be provided in a form in which a plurality of nanostructures are arranged such that, for example, a spherical or aspherical transmission phase distribution is added to a phase distribution having a spatial frequency component. In addition, the meta-lens 100 according to the example embodiment may be provided, for example, such that a plurality of nanostructures are changed to a spatial distribution in which a complex amplitude transmittance distribution of light at an output end has one or more spatial frequencies, thereby representing, for example, at least one of the transmission amplitude distributions $T_{m1}$ and $T_{m2}$ of FIGS. 4A and 4B. For example, the meta-layer 101 of the meta-lens 100 according to the example embodiment may be provided such that a plurality of nanostructures having a dimension less than an operating wavelength are arranged to generate a phase transmittance profile representing a refractive power and a structural change in the plurality of nanostructures forms a complex amplitude transmittance distribution in a period of about three times or more, for example, about 10 times to about 20 times of the operating wavelength as described above. As the structural change in the plurality of nanostructures of the meta-layer 101 is provided to represent the first transmission amplitude distribution $T_{m1}$ of FIG. 4A, the first sub-spot SP1 may be formed to have first illuminance lower than illuminance of the main spot SPm. In addition, as the structural change in the plurality of nanostructures of the meta-layer 101 is provided to represent the second transmission amplitude distribution $T_{m2}$ of FIG. 4B, the second sub-spot SP2 may be formed to have second illuminance lower than the first illuminance of the first spot SP1. The structural change in the plurality of nanostructures of the meta-layer 101 may be provided to indicate, for example, a transmission amplitude distribution obtained by adding the second transmission amplitude distribution $T_{m2}$ of FIG. 4B to the first transmission amplitude distribution $T_{m1}$ of FIG. 4A. In this case, for example, the structural change in the plurality of nanostructures of the meta-layer 101 may also be formed in a form in which a position where the first transmission amplitude distribution $T_{m1}$ of FIG. 4A is formed in a layer thickness direction and a position where the second transmission amplitude distribution $T_{m2}$ of FIG. 4B is formed in the layer thickness direction are different from each other or are combined in the same layer position.

By forming the meta-layer 101 to have such the transmission amplitude distribution, the main spot SPm and the first and second sub-spots SP1 and SP2 having low illuminance asymmetrically distributed with respect to the main spot SPm may be formed on an imaging plane.

As such, the meta-lens 100 according to the example embodiment may be provided to change an arrangement and shapes of a plurality of nanostructures such that phase modulation and transmittance modulation are performed in the meta-layer 101 as illustrated in FIG. 1. In addition, the meta-lens 100 according to the example embodiment may further include at least one additional meta-layer that modulates a phase of light that transmits therethrough to generate a phase transmittance profile representing a refractive power in addition to the meta-layer 101 provided to perform phase modulation and transmittance modulation. The additional meta-layer may have a plurality of nanostructures having a dimension smaller than an operating wavelength to serve as a lens. As such, the meta-lens 100 according to the example embodiment may be provided to include only the meta-layer 101 on which phase modulation and transmittance modulation are performed or may include a plurality of meta-layers including the meta-layer 101.

In addition, the meta-lens 100 according to the example embodiment may be provided such that phase modulation for generating a phase transmittance profile representing a refractive power is performed by the meta-layer 101 and transmittance modulation for forming a plurality of spots of different brightness in an asymmetric distribution on an imaging plane is performed by a transmittance-changing layer 105, as illustrated in FIG. 2.

That is, referring to FIG. 2, the meta-lens 100 according to the example embodiment may include the meta-layer 101 that generates a phase transmittance profile representing a refractive power, and the transmittance-changing layer 105 that modulates the transmittance T(r) of light such that a complex amplitude transmittance distribution of light at an output end has at least one spatial frequency.

In the meta-lens 100 according to the example embodiment of FIG. 2, the meta-layer 101 may be provided to delay the phase $\varphi(\lambda)$ of light passing therethrough according to a refractive index distribution formed by an arrangement of a plurality of nanostructures to generate a phase transmittance profile. The transmittance-changing layer 105 may be provided to have a PSF form in which a complex amplitude transmittance distribution of light at an output end has at least one spatial frequency (a period in a constant direction in space), and form a plurality of spots of different brightness in an asymmetric distribution on an imaging plane. For example, the transmittance-changing layer 105 may be provided to have complex amplitude transmittance that satisfies Equation 1.

According to the meta-lens 100 of the example embodiment illustrated in FIG. 2, a plurality of nanostructures may be arranged in the meta-layer 101 to have a spherical or aspherical transmission phase distribution, and the transmittance-changing layer 105 may be provided to have a phase distribution having a spatial frequency component. The transmittance-changing layer 105 may be provided above or below the meta-layer 101 to spatially change transmittance. FIG. 2 illustrates an example in which the transmittance-changing layer 105 is provided below the meta-layer 101. When the meta-lens 100 includes the meta-layer 101 for phase modulation and the transmittance-changing layer 105 for transmittance modulation, the meta-layer 101 and transmittance-changing layer 105 may form a stacked structure or may be composed of separate members.

The transmittance-changing layer 105 may be provide to branch the sub-ray $L_i$ forming at least one sub-spot to be tilted with respect to the main ray $L_0$ forming the main spot SPm, and modulate the intensity of light transmitting therethrough to form a plurality of spots of different brightness, that is, the main spot SPm by the main ray $L_0$ and at least one sub-spot by the sub-ray $L_i$ in an asymmetric distribution on the imaging plane. To this end, the transmittance-changing layer 105 may include a layer having transmittance that spatially weakly changes to implement weak transmittance amplitude modulation.

For example, the transmittance-changing layer 105 may be provided to represent the first transmission amplitude distribution $T_{m1}$ of FIG. 4A and the second transmission amplitude distribution $T_{m2}$ of FIG. 4B for respectively forming the first sub-spot SP1 and the second sub-spot SP2 having lower illuminance than the main spot SPm. As described above, FIG. 4A illustrates an example of the first transmission amplitude distribution $T_{m1}$ for forming the first sub-spot SP1 having first illuminance less than illuminance of the main spot SPm, and FIG. 4B illustrates an example of the second transmission amplitude distribution $T_{m2}$ for forming the second sub-spot SP2 having second illuminance less than the first illuminance of the first sub-spot SP1. The transmittance-changing layer 105 may be provided to represent a transmission amplitude distribution obtained by adding the second transmission amplitude $T_{m2}$ of FIG. 4B to the first transmission amplitude distribution $T_{m1}$ of FIG. 4A in a period of about three times or more, for example, about 10 to 20 times of the operating wavelength described above. In this case, for example, the transmittance-changing layer 105 may also be provided in a form in which a position where the first transmission amplitude distribution $T_{m1}$ of FIG. 4A is formed in a layer thickness direction and a position where the second transmission amplitude distribution $T_{m2}$ of FIG. 4B is formed in the layer thickness direction are different from each other or are combined in the same layer position.

By forming the transmittance-changing layer 105 to have such the transmission amplitude distribution, the main spot SPm and the first and second sub-spots SP1 and SP2 having low illuminance asymmetrically distributed with respect to the main spot SPm may be formed on an imaging plane.

As such, the transmission amplitude distribution of the transmittance-changing layer 105 may be provided to form at least one sub-spot of which the center is separated from the center of the main spot SPm and which has a lower illuminance than the main spot SPm. The transmittance-changing layer 105 may be formed of, for example, a high energy beam sensitive (HEBS) material. The transmittance-changing layer 105 may be formed of the HEBS material, and a beam of strong energy may be emitted in a gray-level distribution to obtain a local transmittance change.

When the transmittance-changing layer 105 is provided to have a transmission amplitude distribution obtained by adding the second transmission amplitude distribution $T_{m2}$ of FIG. 4B to the first transmission amplitude distribution $T_{m1}$ of FIG. 4A, the main spot SPm and the first and second sub-spots SP1 and SP2 separated from the main spot SPm and asymmetrically distributed with respect to the main spot SPm may be formed on an image plane, as illustrated in FIG. 3.

In addition, as illustrated in FIG. 2, even when transmittance modulation is performed by a separate member, that is, the transmittance-changing layer 105, the meta-lens 100 according to the example embodiment may further include at least one additional meta-layer that modulates a phase of light transmitting therethrough by generating a phase transmittance profile representing a refractive power. The additional meta-layer may have a plurality of nanostructures having a dimension smaller than an operating wavelength to serve as a lens. As such, even when the meta-lens 100 according to the example embodiment includes a separate transmittance-changing layer 105 for transmittance modulation, the meta-lens 100 may be provided to include only the meta-layer 101 that performs phase modulation for generating a phase transmittance profile representing a refractive power or may include a plurality of meta-layers including the meta-layer 101.

As described above, according to the meta-lens 100 of the example embodiment, the meta-layer 101 may be provided to generate a phase transmittance profile by delaying the phase φ (λ) of light passing therethrough and modulate the transmittance T(r) of light. In addition, according to the meta-lens 100 of the example embodiment, the meta-layer 101 may generate a phase transmittance profile representing a refractive power, and the separate transmittance-changing layer 105 may modulate the transmittance T(r) of light such that a complex amplitude transmittance distribution of light at an output end has at least one spatial frequency.

In addition, according to the meta-lens 100 of the example embodiment, in order to form the first sub-spot SP1 and the second sub-spot SP2 in an asymmetric distribution with respect to the main spot SPm, the first transmission amplitude distribution $T_{m1}$ may be formed to be arranged in the first direction, as illustrated in FIG. 4A, and the second transmission amplitude distribution $T_{m2}$ may be formed to be arranged in the second direction forming an angle θ with respect to the first direction, as illustrated in FIG. 4B. In this case, as illustrated in FIG. 3, the first sub-spot SP1 may be formed in the first direction with respect to the main spot SPm, for example, in a horizontal direction, and the second sub-spot SP2 may be formed in the second direction with respect to the main spot SPm, and the first direction may form an angle θ with the second direction. The angle θ between the first direction and the second direction may be a value other than 180 degrees or may be 180 degrees. In this case, the first sub-spot SP1 and the second sub-spot SP2 may be positionally formed asymmetrically or symmetrically with respect to the main spot SPm. In addition, the first sub-spot SP1 and the second sub-spot SP2 may have the same separation distance as or different separation distances from the main spot SPm according to a period of the first transmission amplitude distribution $T_{m1}$ of FIG. 4A and a period of the second transmission amplitude distribution $T_{m2}$ of FIG. 4B.

In another example, the meta-lens 100 according to the example embodiment may be provided to form the main spot SPm and one sub-spot with a lower illuminance than the main spot SPm on an imaging plane, and to this end, the meta-lens 100 according to the example embodiment may include any one of, for example, the first transmission amplitude distribution $T_{m1}$ of FIG. 4A and the second transmission amplitude distribution $T_{m2}$ of FIG. 4B. In addition, the meta-lens 100 may be provided to form the main spot SPm and three or more sub-spots with a lower illuminance than the main spot SPm on an imaging plane in an asymmetric distribution, and in this case the meta-lens 100 according to the example embodiment may be provided to have a transmission amplitude distribution to which three or more transmission amplitude distributions for respectively forming sub-spots are added.

FIG. 3 illustrates an example in which a plurality of spots formed on an imaging plane include the main spot SPm and the first, and second sub-spots SP1 and SP2 with different brightness peak values, which are separated from the main spot SPm and asymmetrically distributed. Here, as described above, the asymmetric distribution may include that the first sub-spot SP1 and the second sub-spot SP2 are opposite to each other with respect to the main spot SPm and have different separation distances from each other. In addition, the asymmetric distribution may include that the first sub-spot SP1 and the second sub-spot SP2 have different brightness peak values and are positionally symmetric with respect to the main spot SPm. The positional symmetry indicates that the first sub-spot SP1 and the second sub-spot SP2 are opposite to each other with respect to the main spot SPm and have the same separation distance.

As such, according to the meta-lens 100 of the example embodiment, the first sub-spot SP1 and the second sub-spot SP2 may be formed in an asymmetric distribution with respect to the main spot SPm in various ways.

In addition, a brightness peak value of at least one sub-spot formed by applying the meta-lens 100 according to the example embodiment may be reduced by about 4 dB to about 10 dB, compared to a brightness peak value of the main spot SPm, and thus, brightness peak values of a plurality of sub-spots SP1 and SP2 are different from each other, for example, even when the plurality of sub-spots SP1 and SP2 are not only positionally asymmetrically formed but also positionally symmetrically formed. For example, when the brightness peak value of the main spot SPm is, for example, 0 dB, the brightness peak value of the first sub-spot SP1 may be, for example, about −6 dB, and the brightness peak value of the second sub-spot SP2 may be, for example, about −12 dB.

Therefore, by using the meta-lens 100 according to the example embodiment, an HDR image may be acquired by image signal processing of deconvoluting an imaging focus shape of an optical system, that is, a PSF by applying a single shot image and a HDR may be expanded.

For example, an imaging device, to which the meta-lens 100 according to the example embodiment is applied, may obtain a main image corresponding to a captured image of the main spot SPm, a first sub-image corresponding to a captured image of the first sub-spot SP1, and a second sub-image corresponding to a captured image of the second sub-spot SP2 by single shot, and brightness peak values of the main image, the first sub-image, and the second sub-image are different from each other. Accordingly, a plurality of images with different brightness peak values for the same scene may be obtained at the same time, and thus, an HDR image may be obtained by performing signal processing on the plurality of images, and an HDR may be increased. In this case, a plurality of images applied to obtain an HDR image may be obtained by single shot, and thus, there is no movement of an object between the plurality of images, and a motion artifact (ghost artifact) due to movement of an object does not occur in an HDR image. That is, when the meta-lens 100 according to the example embodiment is applied to an imaging device, an HDR image without a motion artifact may be obtained by single shot.

In addition, a plurality of nanostructures in the meta-layer 101 of the meta-lens 100 according to the example embodiment may be arranged to form a phase transmittance profile representing a refractive power serving as a lens by delaying a phase of light according to a refractive index distribution formed by the plurality of nanostructures.

For example, according to the meta-lens 100 of the example embodiment, a plurality of nanostructures may be arranged in the meta-layer 101 such that a spherical or aspherical transmission phase distribution for indicating a refractive power serving as a lens is added to a phase distribution having a spatial frequency component for forming a plurality of spots with different brightness peak values in an asymmetric distribution.

In addition, according to the meta-lens 100 of the example embodiment, a phase distribution having a spatial frequency component for forming a plurality of spots with different brightness peak values in an asymmetric distribution is formed by the transmittance-changing layer 105, and a plurality of nanostructures may be arranged in the meta-layer 101 such that a spherical or aspherical transmission phase distribution for indicating a refractive power serving as a lens is added thereto.

A degree of phase transmittance in the meta-layer 101 for indicating a refractive power serving as a lens may vary depending on each position that becomes a variable of a refractive index distribution, and the refractive index distribution may be determined to have a phase transmittance distribution indicating a desired refractive power as a lens. In addition, the refractive index distribution may be determined to generate the same phase transmittance profile or monotonically changing phase transmittance profile for at least two different wavelengths.

Figure 5:
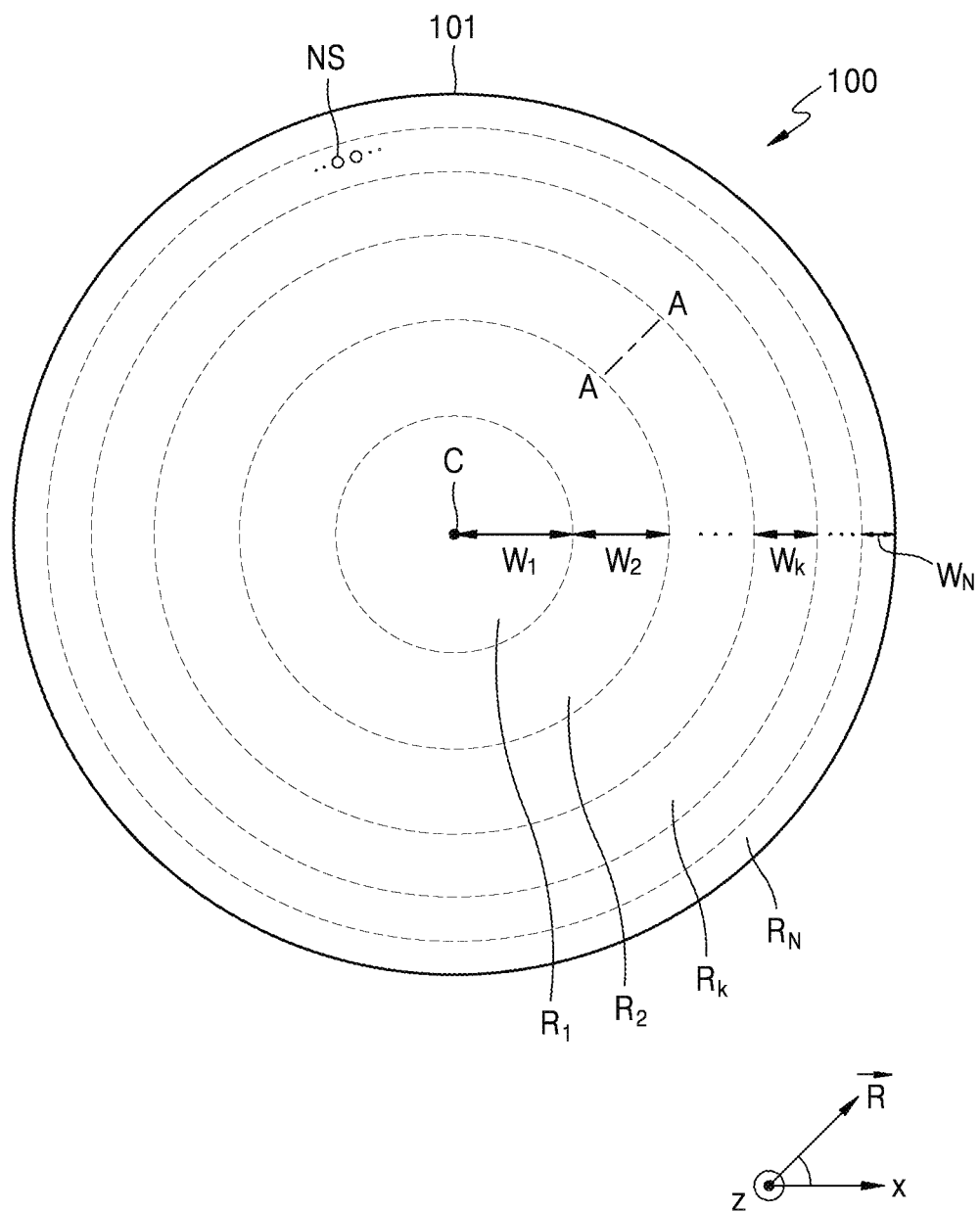
FIG. 5 is a plan view illustrating a schematic structure of a meta-layer of a meta-lens according to an example embodiment.

FIG. 5 is a plan view illustrating a schematic structure of the meta-layer 101 for representing a refractive power serving as a lens of the meta-lens 100 according to the example embodiment.

Referring to FIG. 5, the meta-layer 101 of the meta-lens 100 according to the example embodiment includes a plurality of phase modulation regions Rk arranged in concentric circles to represent a refractive power serving as a lens, and a plurality of nanostructures NS may be provided for each of the plurality of phase modulation regions Rk. The plurality of phase modulation regions Rk may be arranged in a radial direction r from a center C of the meta-lens 100, and widths of the plurality of phase modulation regions Rk may be reduced as a distance from the center C increases. The plurality of nanostructures NS may be arranged on, for example, a substrate. Here, as described above with reference to FIG. 1, the meta-layer 101 may be provided to delay the phase $\varphi(\lambda)$ of light passing therethrough to form a phase transmittance profile and modulate the transmittance T(r) of light. In this case, the arrangement, shapes, sizes, and so on of the plurality of nanostructures NS having a dimension less than an operating wavelength in the plurality of phase modulation regions Rk may be provided such that a plurality of nanostructure structural changes modulate the transmittance T(r) of light as a complex amplitude transmittance distribution of light at an output end has at least one spatial frequency, in addition to forming a phase transmittance profile to represent a refractive power serving as a lens. Accordingly, it is possible to form the main spot SPm and at least one sub-spot with respect to the main spot SPm in an asymmetric distribution on an imaging plane. In another example, as described above with reference to FIG. 2, the meta-layer 101 may be provided to delay the phase $\varphi(\lambda)$ of light passing therethrough, and the arrangement, shapes, sizes, and so on of the plurality of nanostructures NS may be provided to form a phase transmittance profile representing a refractive power serving as a lens.

Figure 7:
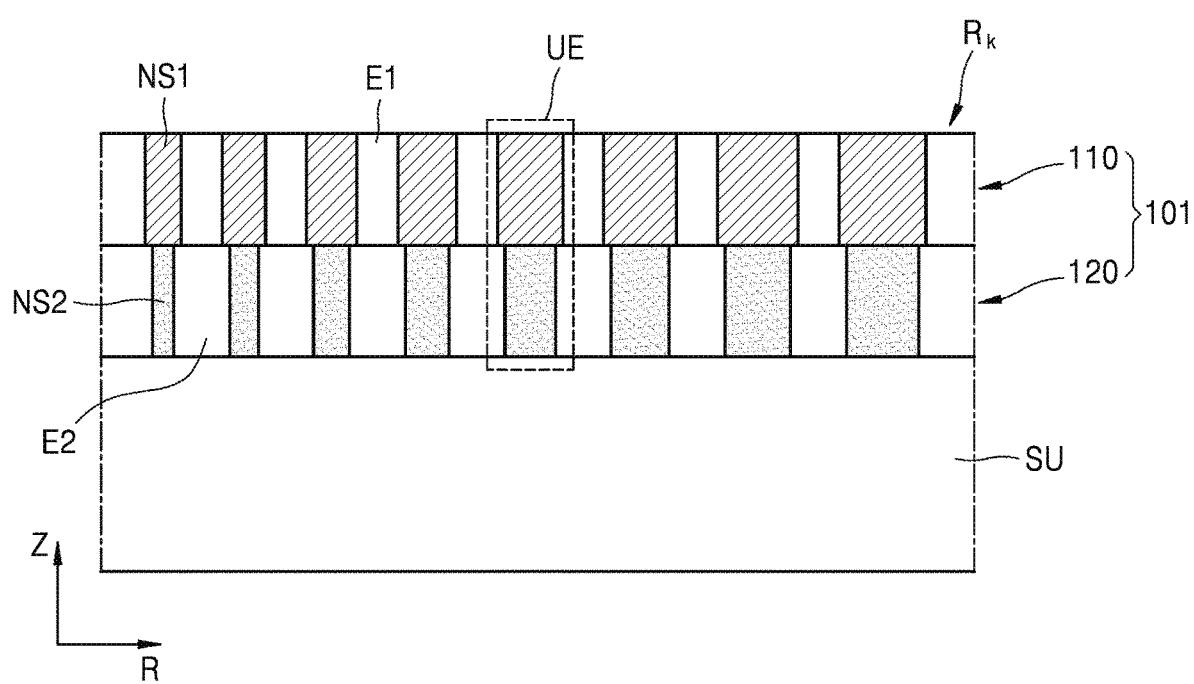
FIG. 7 is a cross-sectional view of a meta-layer taken along line A-A of FIG. 5 when the meta-lens of FIG. 5 implements the phase transmittance profile of FIG. 6.
Figure 10:
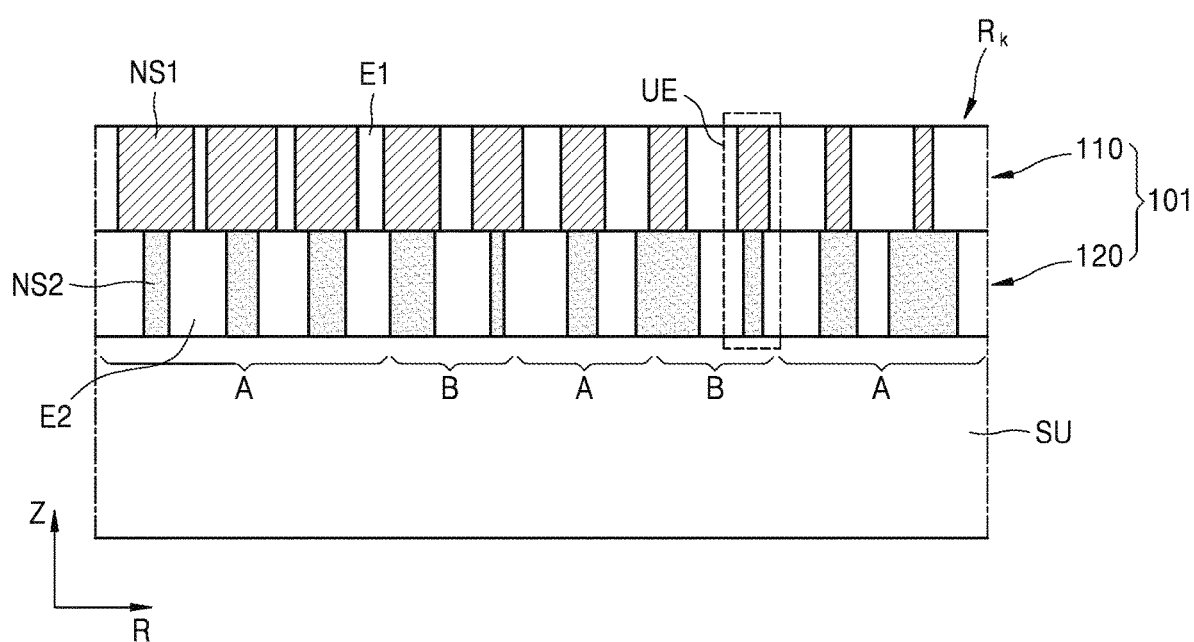
FIG. 10 is a cross-sectional view of a meta-layer taken along line A-A of FIG. 5 when the meta-lens of FIG. 5 implements the phase transmittance of FIG. 8 and the phase transmittance dispersion of FIG. 9.

FIG. 5 illustrates only a few nanostructures NS as an example for convenience. As illustrated in FIGS. 7 and 10, the plurality of nanostructures NS may be arranged in a two-layer structure, and first nanostructures NS1 and first peripheral materials E1 surrounding the first nanostructures are provided in a first layer 110, and second nanostructures NS2 and second peripheral materials E2 surrounding the second nanostructures NS2 may be provided in a second layer 120. The first nanostructures NS1 and the second nanostructures NS2 have a dimension of a sub-wavelength less than an operating wavelength of the meta-lens 100. Here, the operating wavelength of the meta-lens 100 may be a shortest wavelength $\lambda_0$ among a plurality of separated wavelength bands. According to an example embodiment, heights of the first nanostructures NS1 and the second nanostructures NS2 may be greater than an operating wavelength of the meta-lens 100, that is, the shortest wavelength $\lambda_0$ among the plurality of separated wavelength bands. A range of the heights may be about 0.5 to 6 times the wavelength $\lambda_0$ (such as about $0.5\lambda_0$ to about $6.0\lambda_0$).

Figure 6:
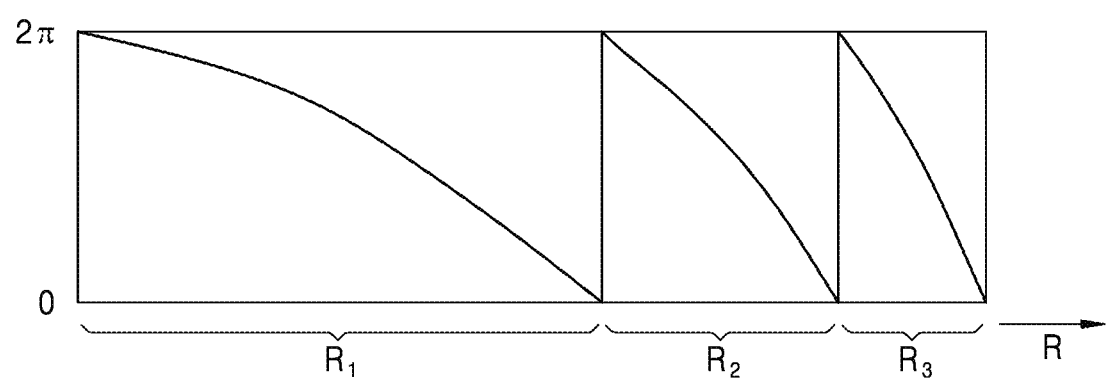
FIG. 6 is a diagram illustrating an example of a phase transmittance profile to be implemented by the meta-lens of FIG. 5.
Figure 8:
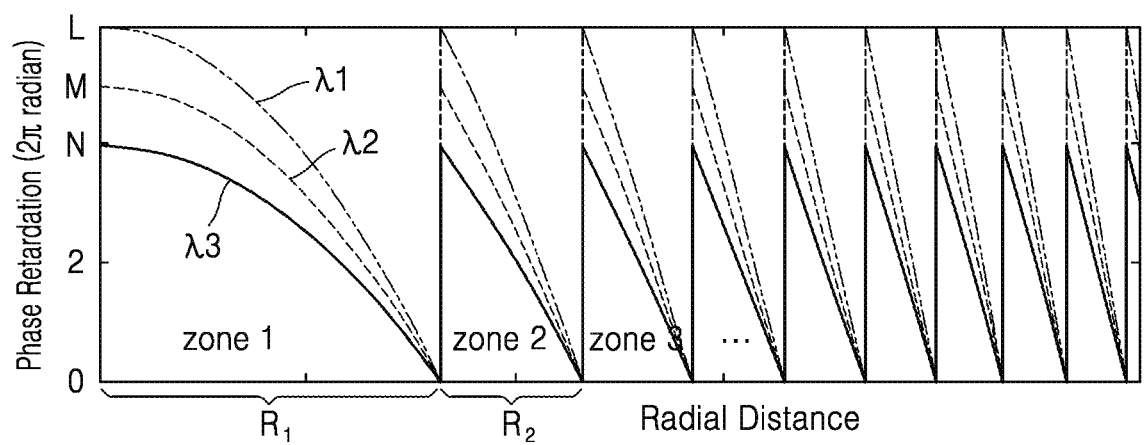
FIG. 8 is a graph illustrating another example of a phase transmittance profile for each wavelength to be implemented by the meta-lens of FIG. 5.

Each of the plurality of phase modulation regions Rk is a region indicating a phase modulation pattern in a preset range. The plurality of phase modulation regions $R_k$ include a first region R1, a second region R2, . . . N-th region RN, which are sequentially arranged in a radial direction r from the center C of the meta-lens 100. As illustrated, the first region R1 may be a circular region, and the second region R2 to the N-th region RN may be an annular region. The first region R1 to the N-th region RN represent phase transmittances of a preset range, and as illustrated in FIGS. 6 and 8, phase modulation ranges may be the same as or different from each other with respect to a plurality of wavelengths. The total number N of phase modulation regions and widths ($W_1$, . . . , $W_k$, . . . $W_N$) of respective regions may be determined according to a refractive power (a focal length) and a lens diameter.

FIG. 6 is a diagram illustrating an example of a phase transmittance profile to be implemented by the meta-lens 100 of FIG. 5, and FIG. 7 is a cross-sectional view of the meta-layer taken along line A-A of FIG. 5 when the phase transmittance profile is implemented.

For example, when an imaging optics, to which the meta-lens 100 according to the example embodiment is applied, includes at least one refractive lens, to correct optical aberration such as chromatic aberration occurring in the refractive lens, the meta-lens 100 according to the example embodiment may be provided to have, for example, a positive refractive power and provide substantially the same phase transmittance profile as illustrated in FIG. 6 for at least two different wavelengths passing therethrough. For example, the fact that phase transmittance profiles are the same as each other for at least two different wavelengths may mean that a difference in the amount of change in a phase transmittance according to a wavelength in an operating wavelength band is within an error of about 10%. When different wavelengths have the same phase transmittance profile, a wavelength and a focal length are inversely proportional to each other, and the meta-lens 100 may have negative chromatic aberration.

As illustrated in FIG. 6, in each of the plurality of phase modulation regions Rk, a phase transmittance has a decreasing profile in an R direction, and phase modulation ranges may be the same as each other for a plurality of wavelengths. To this end, shapes, an arrangement, refractive indices, and so on of the first nanostructure NS1, the first peripheral material E1, the second nanostructure NS2, and the second peripheral material E2 arranged in each of the plurality of phase modulation regions Rk may be determined to have the phase transmittance profile of FIG. 6.

Referring to FIG. 7, the meta-layer 101 may include the first layer 110 including a plurality of first nanostructures NS1 and the first peripheral material E1, and the second layer 120 including a plurality of second nanostructures NS2 and the second peripheral material E2. The meta-layer 101 may be formed on a substrate SU. Another layer may be further provided between the meta-layer 101 and the substrate SU.

Refractive indices, shapes, arrangements, and so on of the first nanostructures NS1, the first peripheral material E1, the second nanostructures NS2, and the second peripheral material E2 may be set such that the first layer 110 and the second layer 120 have different dispersions of an effective refractive index with respect to a change amount of the effective refractive index.

Referring to FIG. 7, the first nanostructure NS1 may be formed of a material having a lower refractive index than a refractive index of the first peripheral material E1, and this shape will be referred to as a nanopore structure for convenience. The second nanostructure NS2 may be formed of a material having a higher refractive index than a refractive index of the second peripheral material E2, and this shape will be referred to as a nanopillar structure for convenience.

According to an example embodiment, the meta-layer 101 may have repeatedly arranged unit elements UE having a two-layer structure of a nanopillar structure and a nanopore structure in the R direction, and the unit elements UE are designed such that an effective refractive index decreases in one direction, for example, the radial direction R, in the phase modulation region Rk, and to this end, the nanopore structure constituting the plurality of first nanostructures NS1 may be designed to increase in width in the radial direction R in the phase modulation region Rk, and the nanopillar structure constituting the plurality of second nanostructures NS2 may be designed to increase in width in the radial direction R in the phase modulation region Rk.

According to the example embodiment, in the meta-layer 101, the unit elements UE, each having a two-layer structure of the nanopillar structure and the nanopore structure, may be repeatedly arranged in the R direction, the phase transmittance within the phase modulation region Rk may have a decreasing profile in the R direction, and the unit elements UE may be designed to provide the same phase transmittance profile to light in an operating wavelength band.

Because the phase transmittance is proportional to the effective refractive index, the unit elements UEs may be designed to reduce the effective refractive indices in the R direction within the phase modulation region Rk, and to this end, the first nanostructures NS1, for example, internal hole structures may be designed to increase in width in the R direction, and the second nanostructures NS2, for example, internal pillar structures may be designed to increase in width in the R direction.

For example, if the first nanostructure NS1 is air and the first peripheral material E1 surrounding the first nanostructure NS1 is $SiO_2$, since a refractive index of air is less than a refractive index of $SiO_2$, as a width of an air column increases, an effective refractive index of the first layer 110 gradually decreases. Since the size of dispersion of most optical materials decreases as the effective refractive index decreases, dispersion of the first layer 110 also decreases in the R direction. However, since a reduction ratio of an effective refractive index and a reduction ratio of dispersion are different, it is difficult to provide the same phase transmittance profile for light of different wavelengths only with the first layer 110. The second layer 120 may correct a difference between a change in effective refractive index and a change in dispersion.

For example, when the second nanostructure NS2 is $TiO_2$ and the second peripheral material E2 is $SiO_2$, an effective refractive index of the second layer 120 in the phase modulation region Rk increases in the R direction because a refractive index of $TiO_2$ is higher than a refractive index of $SiO_2$. By designing the amount of increase in the effective refractive index of the second layer 120 to be less than the amount of decrease in the effective refractive index of the first layer 110, an effective refractive index and a phase transmittance profile of the unit element UE may decrease in the R direction. At the same time, a ratio of an increase in dispersion to an increase in refractive index of the second nanostructure NS2 may be designed to be greater than a ratio of a decrease in dispersion to a decrease in refractive index of the first layer 110. In other words, in the phase modulation region Rk, in order to prevent a phase transmittance for each wavelength from changing as dispersion of the first layer 110 decreases in the R direction, dispersion of the second layer 120 increases in the R direction to be enough to correct the change in phase transmittance. And in this case, a ratio of an increase in dispersion to an increase in refractive index of the second layer 120 is designed to be greater than a ratio of a decrease in dispersion to a decrease in refractive index of the first layer 110 because the refractive index of the second layer 120 should not increase enough to offset all the amount of decrease in the refractive index of the first layer 110.

In general, a material having a high refractive index has a greater dispersion change rate than a change rate of an effective refractive index, and thus, a material having a higher refractive index than a refractive index of the first nanostructure NS1 may be used as a material of the second nanostructure NS2. In addition, nanostructures having a small height among the first and second nanostructures NS1 and NS2 may be formed of a material having a high refractive index.

As such, the meta-layer 101 may have a profile in which a phase transmittance in the phase modulation region Rk decreases in the R direction, and the unit element UE may be designed to provide the same phase transmittance profile for at least two different wavelengths.

Figure 9:
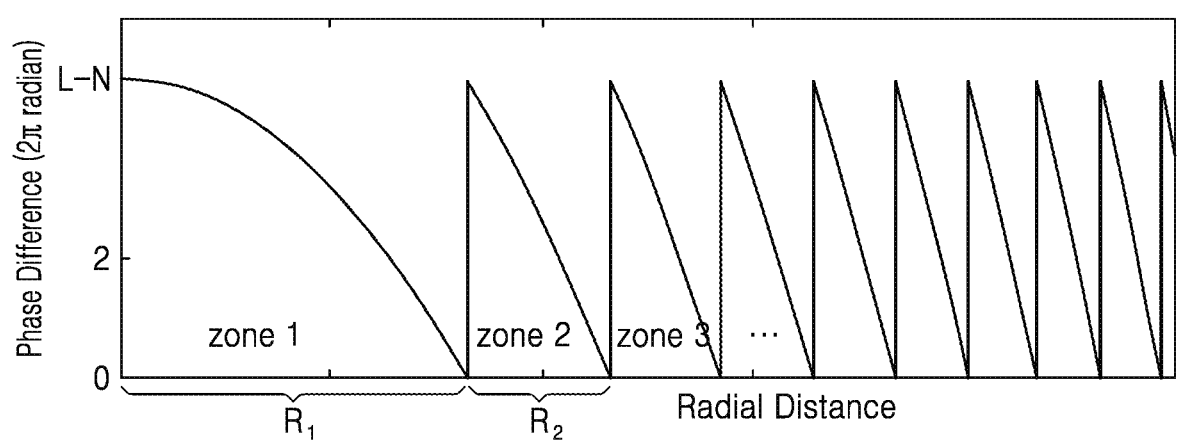
FIG. 9 is a graph illustrating an example of a phase transmittance dispersion represented by the meta-lens of FIG. 5.

FIG. 8 is a graph illustrating another example of the phase transmittance profile for each wavelength to be implemented by the meta-lens 100 of FIG. 5, and FIG. 9 is a graph illustrating an example of a phase transmittance dispersion represented by the meta-lens 100 of FIG. 5. FIG. 10 is a cross-sectional view of the meta-layer 101 taken along line A-A of FIG. 5 when the meta-lens 100 implements a phase transmittance and a phase transmittance dispersion of FIGS. 8 and 9.

For example, in order to implement the meta-lens 100 without chromatic aberration, the meta-lens 100 according to the example embodiment may be provided to form phase transmittance profiles having different phase modulation ranges while monotonically changing for at least two different wavelengths, as illustrated in FIGS. 8 and 9.

In each of the plurality of phase modulation regions Rk, phase modulation ranges may be different from each other for a plurality of wavelengths, as illustrated in FIG. 8. To this end, the shapes, arrangements, refractive indices, and so on of the first nanostructures NS1, the first peripheral material E1, the second nanostructures NS2, and the second peripheral material E2 arranged in each of the plurality of phase modulation regions Rk may be determined such that the plurality of phase modulation regions Rk have the phase transmittance profile and the phase transmittance dispersion of FIGS. 8 and 9.

Referring to FIG. 10, the meta-layer 101 may include a first layer 110 including a plurality of first nanostructures NS1 and a first peripheral material E1, and a second layer 120 including a plurality of second nanostructures NS2 and a second peripheral material E2.

Refractive indices, shapes, arrangements, and so on of the first nanostructures NS1, the first peripheral material E1, the second nanostructures NS2, and the second peripheral material E2 may be set such that the first layer 110 and the second layer 120 have different dispersions of an effective refractive index with respect to a change amount of the effective refractive index.

The meta-layer 101 may be provided to form phase transmittance profiles having different phase modulation ranges while monotonically changing for at least two different wavelengths, as illustrated in FIG. 8. To this end, referring to FIG. 10, the first nanostructures NS1 may be formed of a material having a higher refractive index than a refractive index of the first peripheral material E1, and this shape will be referred to as a nanopillar structure for convenience. The second nanostructure NS2 may be formed of a material having a lower refractive index than a refractive index of the second peripheral material E2, and this shape will be referred to as a nanopore structure for convenience. The meta-layer 101 may have a structure in which the unit elements UE having a two-layer structure of a nanopillar structure and a nanopore structure are repeatedly arranged. The nanopillar structure has a tendency that dispersion of an effective refractive index increases as the effective refractive index increases. In other words, when a fill factor occupied by the first nanostructure NS1 in the unit element UE increases to increase an effective refractive index, the dispersion of effective refractive index also increases. In contrast to this, the nanopore structure has a tendency that, when a fill factor occupied by the second nanostructure NS2 in the unit element UE decreases to increase the effective refractive index, the dispersion of effective refractive index slightly increases or decreases, compared to the nanopillar structure. It may be seen that a dispersion change rate of an effective refractive index of the nanopore structure does not represent significant dependence on a change rate of the effective refractive index. A difference between dispersion characteristics of the nanopillar structure and dispersion characteristics of the nanopore structure may be caused by a difference in electric field focusing of the two structures. The meta-lens 100 according to the example embodiment uses the unit element (UE) in which a nanopillar structure and a nanopore structure having different dispersion change amounts of an effective refractive index with respect to a change amount of the effective refractive index as described above. A desired phase transmittance and phase transmittance dispersion may be achieved by adjusting detailed dimensions constituting the unit elements UE according to positions.

In the example embodiment, the plurality of first nanostructures NS1 may each include a region in which a width thereof monotonically changes in one direction, for example, a radial direction (the R direction) within the phase modulation region Rk. In the plurality of second nanostructures NS2, widths of the plurality of first nanostructures NS1 may change one or more times in one direction at radial direction positions where the widths of the plurality of first nanostructures NS1 change monotonously.

The phase modulation region Rk may include a first zone A in which signs of change rates of an effective refractive index depending on positions in the first layer 110 and the second layer are the same, and a second zone B in which the signs of the change rates of the effective refractive index depending on the positions in the first layer 110 and the second layer 120 are opposite to each other. The sum of the first zones A may be wider than the sum of the second zones B. In other words, a region where the signs of change rates of effective refractive indices of the first layer 110 and the second layer 120 are the same may be greater than a region where the signs are different from each other, in the phase modulation region Rk.

As illustrated in FIG. 10, in the first zone A, widths of the first nanostructures NS1 in the first layer 110 decrease in a radial direction (the R direction) and effective refractive indices thereof decrease, and widths of the second nanostructures NS2 in the second layer 120 increase in a radial direction (the R direction) and effective refractive indices thereof decrease. In the second zone B, the widths of the first nanostructure NS1 in the first layer 110 decrease in the radial direction R and the effective refractive indices thereof decrease, and the widths of the second nanostructures NS2 in the second layer 120 decrease in the radial direction R and the effective refractive indices thereof increase. One or more first zones A and one or more second zones B may be provided in the phase modulation region Rk, and a plurality of first zones A and a plurality of second zones B may be alternately arranged.

However, the shapes and arrangements of the first nanostructures NS1 and the second nanostructures NS2 described herein may be only examples that implement the phase transmittance and the phase transmittance dispersion illustrated in FIGS. 8 and 9, and the phase transmittance and the phase transmittance dispersion illustrated in FIGS. 8 and 9 may be implemented in different shapes and arrangements.

A change tendency of effective refractive indices and a dispersion change tendency for a change in the effective refractive indices appear similarly in the first layer 110 having a nanopillar structure, whereas in the second layer 120, there is a little relationship between the change tendency of effective refractive indices and a dispersion change tendency for the change in effective refractive indices, and thus, the first layer 110 may be a layer that mainly contributes to a phase transmittance dispersion of the meta-lens 100. A phase transmittance by the first layer 110 and a phase transmittance by the second layer 120 both contribute to a phase transmittance represented by the meta-lens 100.

A boundary between a plurality of phase modulation regions R1, R2, . . . illustrated in FIG. 8 is defined as a position where the phase transmittance dispersion changes from the maximum to the minimum. A phase transmittance profile illustrated in FIG. 8 may be derived by setting a phase transmittance value at a region start position to have a phase transmittance value of 0 at the end of each of the phase modulation regions R1, R2, . . . .

The phase transmittance profile appearing in each region represents a phase modulation range of k times ($|k|\geq 1$) of $2\pi$, for light of each of a plurality of wavelength bands having center wavelengths of $\lambda 1$, $\lambda 2$, and $\lambda 3$. The plurality of illustrated phase transmittance profiles represent a less phase modulation range for light of a long wavelength band among the plurality of wavelength bands than that of light of a short wavelength band. For example, the illustrated three phase transmittance profiles respectively represent phase modulation ranges of L times, M times, and N times ($|L|\geq 1$, $|M|\geq 1$, $|N|\geq 1$, and $L \neq M \neq N$) of $2\pi$ for light of the plurality of wavelength bands. L, M, and N may be set to satisfy a condition of $L*\lambda 1=M*\lambda 2=N*\lambda 3$. When inversion of the plurality of wavelengths may be represented as an integer ratio, that is, when $1/\lambda 1:1/\lambda 2:1/\lambda 3$ is represented as an integer ratio, L, M, and N also are integers. When $\lambda 1$, $\lambda 2$, and $\lambda 3$ are respectively 450 nm, 540 nm, and 675 nm, L, M, and N are respectively 6, 5, and 4.

The graph of FIG. 9 is a graph of a phase transmittance dispersion extracted from the graph of FIG. 8 and illustrates $\varphi(\lambda 1)-\varphi(\lambda 3)$ that the meta-lens 100 according to the example embodiment satisfies. The phase transmittance dispersion changes monotonically in a range of $2\pi*(L-N)$ in a plurality of phase modulation regions. When $\lambda 1$, $\lambda 2$, and $\lambda 3$ are respectively 450 nm, 540 nm, and 675 nm, a range of the phase transmittance dispersion is $4\pi$.

The meta-lens 100 according to the example embodiment may implement a phase transmittance and a phase transmittance dispersion generating a monotonically changing phase transmittance profile for at least two different wavelengths, as illustrated in FIGS. 8 and 9, and thereby, an achromatic meta-lens 100 may be implemented.

As described above, the meta-layer 101 in the meta-lens 100 according to the example embodiment may have the nanostructures NS that form the unit element UE and are composed of a structure of two layers or more to provide the same phase transmittance profile for at least two different wavelengths or to provide a monotonically changing phase transmittance profile.

In this case, the nanostructures NS may correspond to meta-atoms forming the meta-layer 101. That is, in the meta-lens 100 according to the example embodiment, the meta-layer 101 may be formed of an arrangement of meta-atoms having a width less than an operating wavelength, and the meta-atoms may be arranged such that a distance between adjacent centers is, for example, about ⅔ or less of a wavelength of operating light. The meta-atoms may be designed to modulate a phase and intensity of light transmitting therethrough while changing its shape, and the meta-atoms may be arranged such that complex amplitude transmittance (a phase and intensity) characteristics of the meta-lens 100 may be designed to have a PSF desired by the entire imaging optics. The meta-atoms may be arranged in, for example, a square or hexagonal grid arrangement.

In order to implement the meta-atoms, the nanostructure NS may include a high refractive index material with a higher refractive index than surroundings thereof (for example, c-Si, p-Si, a-Si, III-V compound semiconductor (GaAs, GaP, GaN, GaAs, and so on), SiC, TiO$_2$, TiSiOx, Si$_3$N$_4$, SiN, or so on) or a material with a lower refractive index than surroundings thereof (for example, a polymer material such as SU-8 and PMMA, SiO$_2$, SOG, or air). A cross-section of the nanostructure NS may have various shapes, for example, a symmetrical shape such as a circle or a square, or an asymmetrical shape such as an ellipse, a rectangle, or an L shape and may have a cross shape or two or more separated sub-nanostructures. In addition, the nanostructure NS may have a length of, for example, about ½ or more to about 8 times or less of an operating wavelength.

In addition, in the meta-layer 101 of the meta-lens 100 according to the example embodiment, the nanostructures NS forming the unit elements UE are arranged in structures of two layers or two or more layers, and at least one, for example, two or more thin film layers (for example, 115 in FIG. 13) less than an operating wavelength may be provided between the layer structures of the nanostructures NS. In addition, the meta-layer 101 of the meta-lens 100 according to the example embodiment may have a stacked structure of two or more layers, and at least one, for example, two or more thin film layers sufficiently thinner than an operating wavelength may be provided between two layers of the meta-layer 101. The thin film layer may reduce reflection between the nanostructure NS layer structures or between two layers of the meta-layer 101 or may be introduced as needed in a manufacturing process.

Figure 11A:
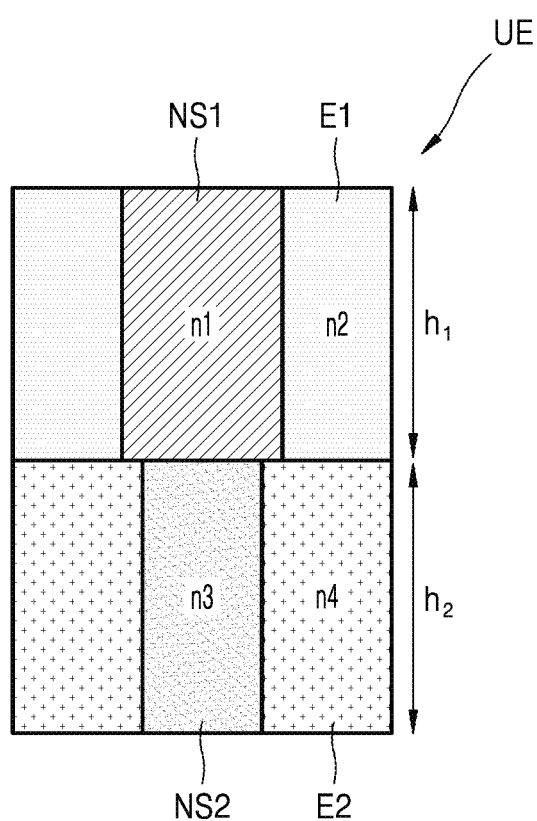
FIGS. 11A to 11O are a cross-sectional view and plan views illustrating in detail refractive indices and shape dimensions of a unit element having a stacked structure of a first nanostructure NS1 and a second nanostructure NS2 illustrated in FIGS. 7 and 10.

FIGS. 11A to 11O are a cross-sectional view and plan views illustrating in detail refractive indices and dimensions of a unit element having a stacked structure of a first nanostructure NS1 and a second nanostructure NS2 illustrated in FIGS. 7 and 10.

Figure 11B:
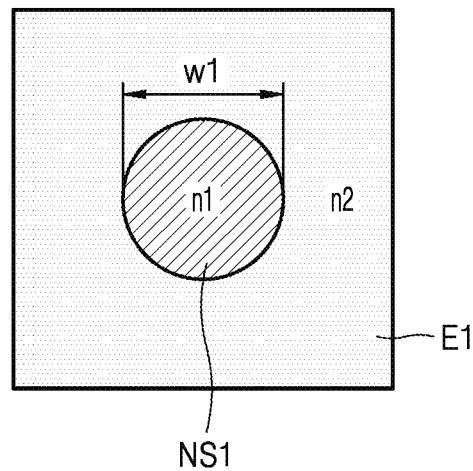
Figure 11C:
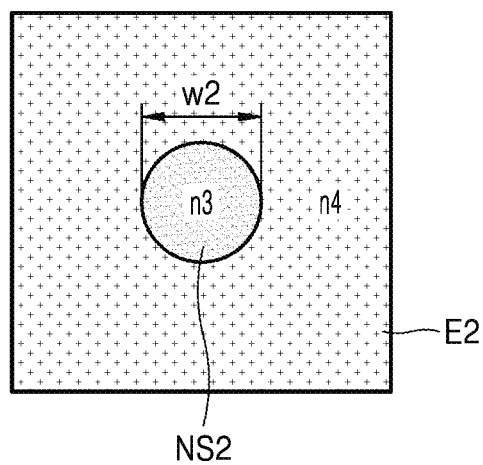

As illustrated in FIGS. 11A to 11O, a first nanostructure NS1 may have a column shape with a diameter w1 and a height h1, and a second nanostructure NS2 may have a column shape with a diameter w2 and a height h2. For example, the first nanostructure NS1 and the second nanostructure NS2 may each be provided as a cylinder having a circular cross-sectional shape as illustrated in FIGS. 11B and 11C. FIGS. 11A to 11O illustrate an example in which the first nanostructure NS1 has a cylindrical shape with the diameter w1 and the height h1, and an example in which the second nanostructure NS2 has a cylindrical shape with the diameter w2 and the height h2. In another example, the first nanostructure NS1 and the second nanostructure NS2 may have a square shape or an asymmetrical shape such as an elliptical shape, a rectangular shape, or an L shape and may have a cross shape or two or more separate sub-nanostructures.

As described with reference to FIG. 7, when the meta-layer 101 forms the same phase transmittance profile for at least two different wavelengths, a refractive index n1 of the first nanostructure NS1 is smaller than the refractive index n2 of the first peripheral material E1, and a difference between the refractive indices may be, for example, 0.2 or more, or 0.5 or more. A refractive index n3 of the second nanostructure NS2 is greater than a refractive index n4 of the second peripheral material E2, and a difference between the refractive indices may be, for example, 0.2 or more, or 0.5 or more.

In this case, a material with a low refractive index and a low absorption rate in an operating wavelength band of the meta-lens 100 may be used for the first nanostructure NS1. The material of the first nanostructure NS1 may include a polymer material such as SU-8 or PMMA, SiO$_2$, SOG, or air. The first peripheral material E1 may include a material with a relatively high refractive index and a low absorption rate. For example, the first peripheral material E1 may include c-Si, p-Si, a-Si, III-V compound semiconductor (GaAs, GaP, GaN, GaAs, or so on), SiC, TiO$_2$, TiSiOx, Si$_3$N$_4$, or SiN. The first nanostructure NS1 may have a shape of an empty hole surrounded by the first peripheral material E1. A material with a high refractive index and a low absorption rate in an operating wavelength band of the meta-lens 100 may be used for the second nanostructure NS2. For example, the material of the second nanostructure NS2 may include c-Si, p-Si, a-Si, III-V compound semiconductor (GaAs, GaP, GaN, GaAs, or so on), SiC, $TiO_2$, TiSiOx, $Si_3N_4$, or SiN. A material with a relatively low refractive index and a low absorption rate may be used for the second peripheral material E2. For example, the second peripheral material E2 may include a polymer material such as SU-8 or PMMA, $SiO_2$, SOG, or air As described with reference to FIG. 10, when the meta-layer 101 forms a monotonically changing phase transmittance profile for at least two different wavelengths, the refractive index n1 of the first nanostructure NS1 is greater than the refractive index n2 of the first peripheral material E1, and a difference between the refractive indices may be, for example, 0.2 or more, or 0.5 or more. A refractive index n3 of the second nanostructure NS2 is less than a refractive index n4 of the second peripheral material E2, and a difference between the refractive indices may be, for example, 0.2 or more, or 0.5 or more.

A material with a high refractive index and a low absorption rate in an operating wavelength band of the meta-lens 100 may be used for the first nanostructure NS1. For example, c-Si, p-Si, a-Si, III-V compound semiconductor (GaAs, GaP, GaN, GaAs, or so on), SiC, $TiO_2$, TiSiOx, $Si_3N_4$, or SiN may be used for a material of the first nanostructure NS1. A material with a relatively low refractive index and a low absorption rate may be used for the first peripheral material E1. For example, a polymer material such as SU-8 or PMMA, $SiO_2$, SOG, or air may be used for the first peripheral material E1.

A material with a low refractive index and a low absorption rate in an operating wavelength band of the meta-lens 100 may be used for the second nanostructure NS2. The second nanostructure NS2 may include a polymer material such as SU-8 or PMMA, $SiO_2$, SOG, or air. The second peripheral material E2 may include a material with a relatively high refractive index and a low absorption rate. For example, the second peripheral material E2 may include c-Si, p-Si, a-Si, III-V compound semiconductor (GaAs, GaP, GaN, GaAs, or so on), SiC, $TiO_2$, TiSiOx, $Si_3N_4$, or SiN. The second nanostructure NS2 may have a shape of an empty hole surrounded by the second peripheral material E2.

Referring back to FIGS. 11A to 11O, an aspect ratio representing a ratio of a height to a diameter of the first nanostructure NS1 and the second nanostructure NS2 may be greater than 1. The aspect ratio may be 2 or more, 3 or more, 5 or more, 10 or more, or 15 or more, and may be 50 or less.

Although the first nanostructure NS1 and the second nanostructure NS2 are illustrated in a cylindrical shape, the first nanostructure NS1 and the second nanostructure NS2 are not limited thereto and may have various shapes such as various polygonal columns or elliptical columns. In addition, the first nanostructure NS1 and the second nanostructure NS2 may have a different cross-section each other. For example, a cross-section of the first nanostructure NS1 may be circular, and a cross-section of the second nanostructure NS2 may be rectangular.

In addition, a shape of the unit element UE applied to the meta-layer 101 of FIGS. 7 and 10 may be variously changed. The shape of the unit element UE is illustrated in an arrangement in which the centers of the first nanostructure NS1 and the second nanostructure NS2 of the first layer 110 and the second layer 120 are aligned, but this is an example, and embodiments are not limited thereto. In the shape of the unit element UE, central axes of the first nanostructure NS1 and the second nanostructure NS2 may be misaligned at a preset interval without coinciding with each other, and a range thereof is not limited. Not only the widths w1 and w2 but also the misalignment interval of the first nanostructure NS1 and the second nanostructure NS2 may be used as design variables, and also, heights of the first nanostructure NS1 and the second nanostructure NS2 may be used as the design variables.

In addition, a shape of an inner pillar and a shell pillar surrounding the inner pillar may be employed as the first nanostructure NS1 or the second nanostructure NS2 of the unit element UE of the meta-layer 101. This structure may be employed as a structure similar to a nanopore structure having a low dependence of a dispersion change rate with respect to a change rate of an effective refractive index. A refractive index of the inner pillar may be less than a refractive index of a peripheral material, and a refractive index of the shell pillar may be greater than a refractive index of the inner pillar. The refractive index of the shell pillar may be greater or less than the refractive index of the peripheral material.

Figure 12:
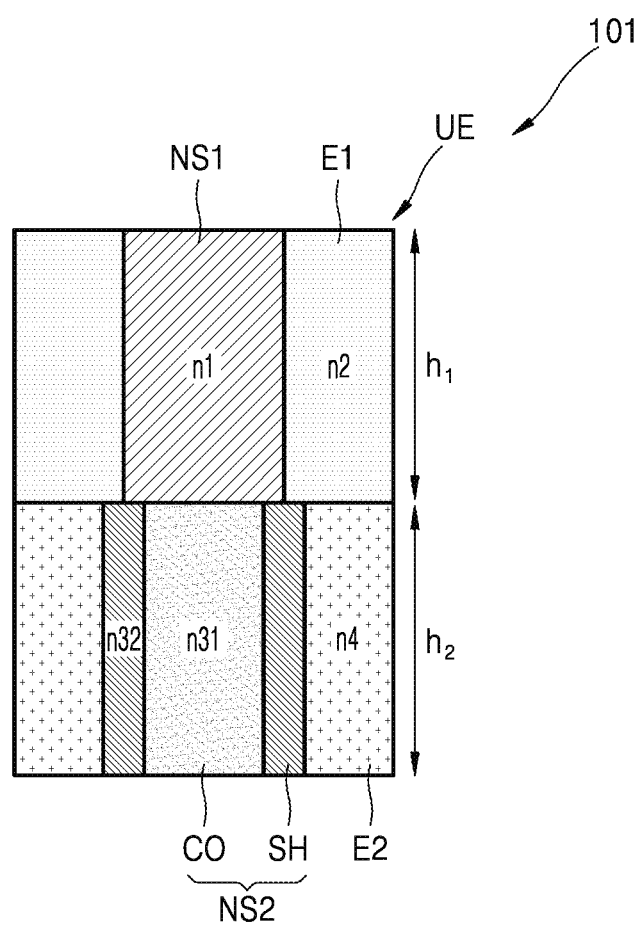
FIG. 12 is a cross-sectional view illustrating another example of a unit element applicable to the stacked structure of the first nanostructure NS1 and the second nanostructure NS2 illustrated in FIGS. 7 and 10.

For example, a nanostructure having a shape including an inner pillar and a shell pillar may be applied to at least one of two layers of the meta-layer 101, and a difference between refractive indices thereof may be set differently as illustrated in FIG. 12. As illustrated in FIG. 12, a shape including an inner column CO and a shell column SH surrounding the inner column CO may be employed as a second nanostructure NS2 of a unit element UE of the meta-layer 101, This structure may be employed as a structure similar to a nanopore structure with a low dependence of a dispersion change rate with respect to a change rate of an effective refractive index. A refractive index n31 of the inner pillar CO may be less than a refractive index n4 of the second peripheral material E2, and a refractive index of the shell pillar SH may be greater than the refractive index n31 of the inner pillar CO. A refractive index n32 of the shell pillar SH may be greater than or less than the refractive index n4 of the second peripheral material E2. FIG. 12 is a cross-sectional view illustrating another example of a unit element applicable to a stacked structure of the first nanostructure NS1 and the second nanostructure NS2 illustrated in FIGS. 7 and 10. In another example, a shape including the inner pillar CO and the shell pillar SH surrounding the inner pillar CO may be employed as the first nanostructure NS1 of the unit element UE of the meta-layer 101 or both the first nanostructure NS1 and the second nanostructure NS2 thereof.

In addition, the second peripheral material E2 of the second layer 120 in the meta-layer 101 may cover both a side surface and a top surface of the second nanostructure NS2, and also, the peripheral material E1 of the first layer 110 may cover both a side surface and an upper surface of the first nanostructure NS1.

In addition, a nanopillar structure may be used in both layers of the meta-layer 101 and a difference between refractive indices may also be set differently or a nanopore structure may be used in both layers thereof and a difference between refractive indices may also be set differently.

Figure 13:
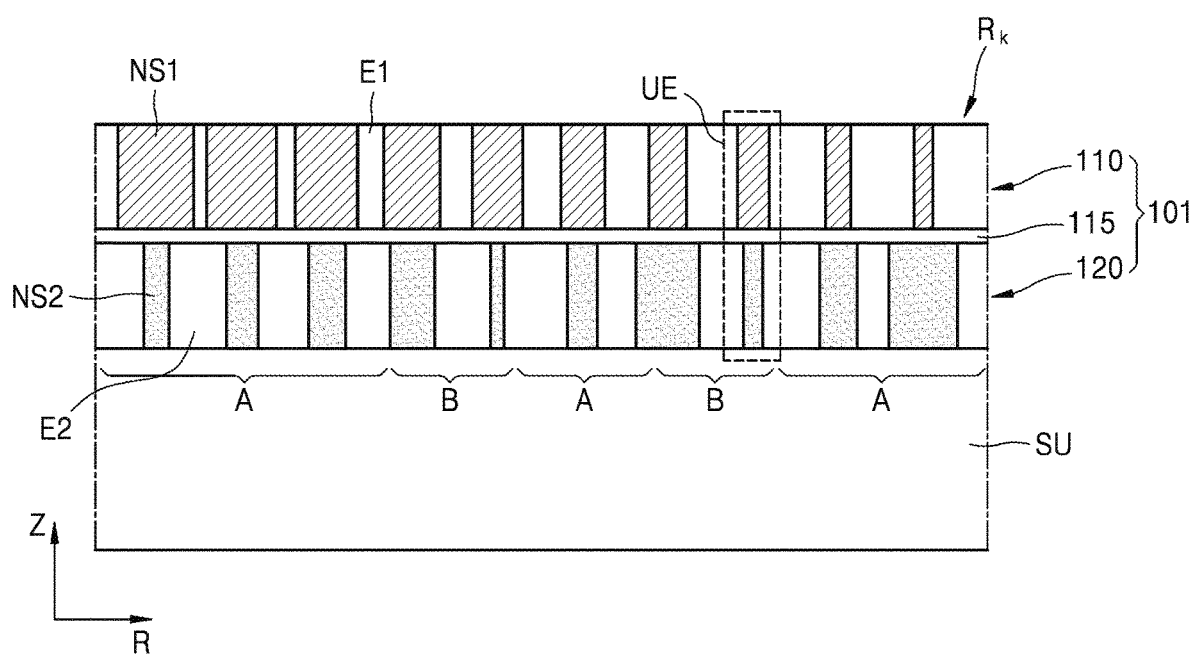
FIG. 13 is a cross-sectional view schematically illustrating another example of a meta-layer of a meta-lens according to an example embodiment.

In addition, as illustrated in FIG. 13, for example, at least one or two or more thin film layers 115 less than an operating wavelength may be provided between the first layer 110 and the second layer 120 of the meta-layer 101. The thin film layer 115 may reduce reflection between the first layer 110 and the second layer 12 or may be introduced as needed in a manufacturing process. The thin film layer 115 may be formed of, for example, a dielectric material. When the first nanostructure NS1 of the first layer 110 or the second nanostructure NS2 of the second layer 120 has a high refractive index, the thin film layer 115 may have a lower refractive index than a refractive index of the first nanostructure NS1 or the second nanostructure NS2. When the first nanostructure NS1 or the second nanostructure NS2 has a low refractive index, the thin film layer 115 may have a higher refractive index than the refractive index of the first nanostructure NS1 or the second nanostructure NS2. For example, the thin film layer 115 may be formed of the same material as the first peripheral material EN1 or the second peripheral material EN2. When the thin film layer 115 has two or more layers, for example, at least one layer of the thin film layer 115 may be formed of the same material as the first peripheral material EN1 or the second peripheral material EN2. The thin film layer 115 may serve as a spacer layer. FIG. 13 illustrates an example in which the thin film layer 115 is applied to a structure of the meta-layer 101 of FIG. 10, and the thin film layer 115 may also be applied to the structure of the meta-layer 101 of FIG. 7.

As described above, the meta-layer 101 of the meta-lens 100 according to the example embodiment may be provided to form the same phase transmittance profile or a monotonically changing phase transmittance profile for at least two different wavelengths. When the meta-layer 101 forms the same phase transmittance profile for at least two different wavelengths, the meta-lens 100 according to the example embodiment may have, for example, negative chromatic aberration, and may correct chromatic aberration and so on occurring at a refractive lens. In addition, when the meta-layer 101 forms a monotonically changing phase transmittance profile for at least two different wavelengths, the meta-lens 100 according to the example embodiment may implement an achromatic meta-lens.

In addition, the meta-layer 101 or the transmittance-changing layer 105 of the meta-lens 100 according to the example embodiment may be provided to modulate intensity of light, a complex amplitude transmittance distribution of light at an output end has at least one spatial frequency, and thus, a plurality of spots of different brightness may be formed on an imaging plane in an asymmetric distribution. Accordingly, the meta-lens 100 according to the example embodiment may form a plurality of spots having different brightness peak values on an imaging plane in which include the main spot SPm and at least one sub-spot having a center separated from the center of the main spot SPm and having lower illuminance than the main spot SPm.

Therefore, the meta-lens 100 according to the example embodiment may have the same phase transmittance profile or a monotonously changing phase transmittance profile for at least two different wavelengths, thereby implementing a lens for correcting chromatic aberration or an achromatic lens. In addition, the meta-lens 100 according to the example embodiment may include a plurality of spots formed in a form of different brightness peak values with an asymmetric distribution and in a form of a PSF on an imaging plane, and thus, an HDR image may be obtained by image signal processing of deconvoluting an imaging focus shape of an optical system, that is, a PSF by applying a single shot image.

Figure 14:
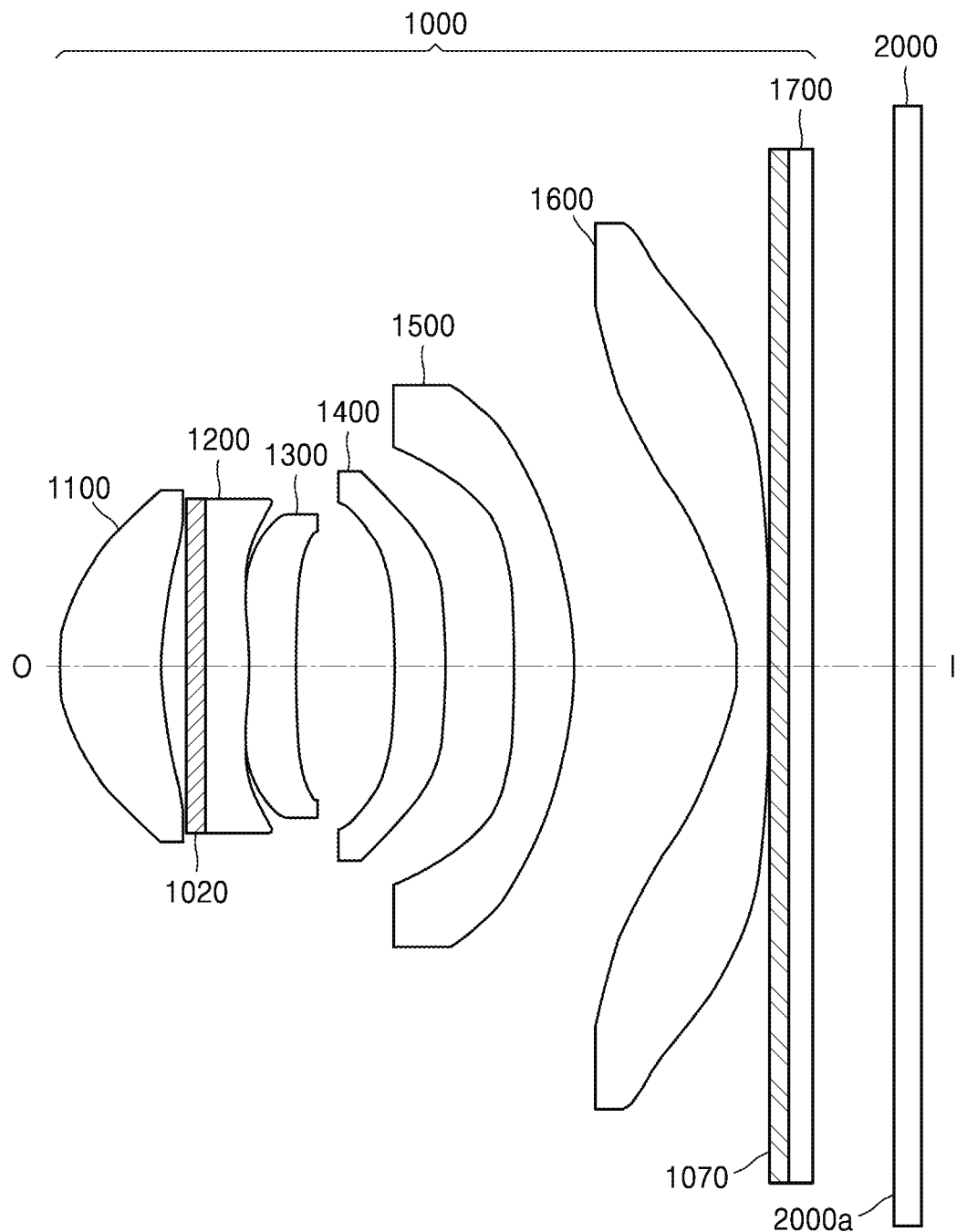
FIGS. 14 to 16 illustrate optical configurations of an imaging optics to which a meta-lens is applied and an imaging device in which the imaging optics is applied as an imaging lens, according to an example embodiment.
Figure 15:
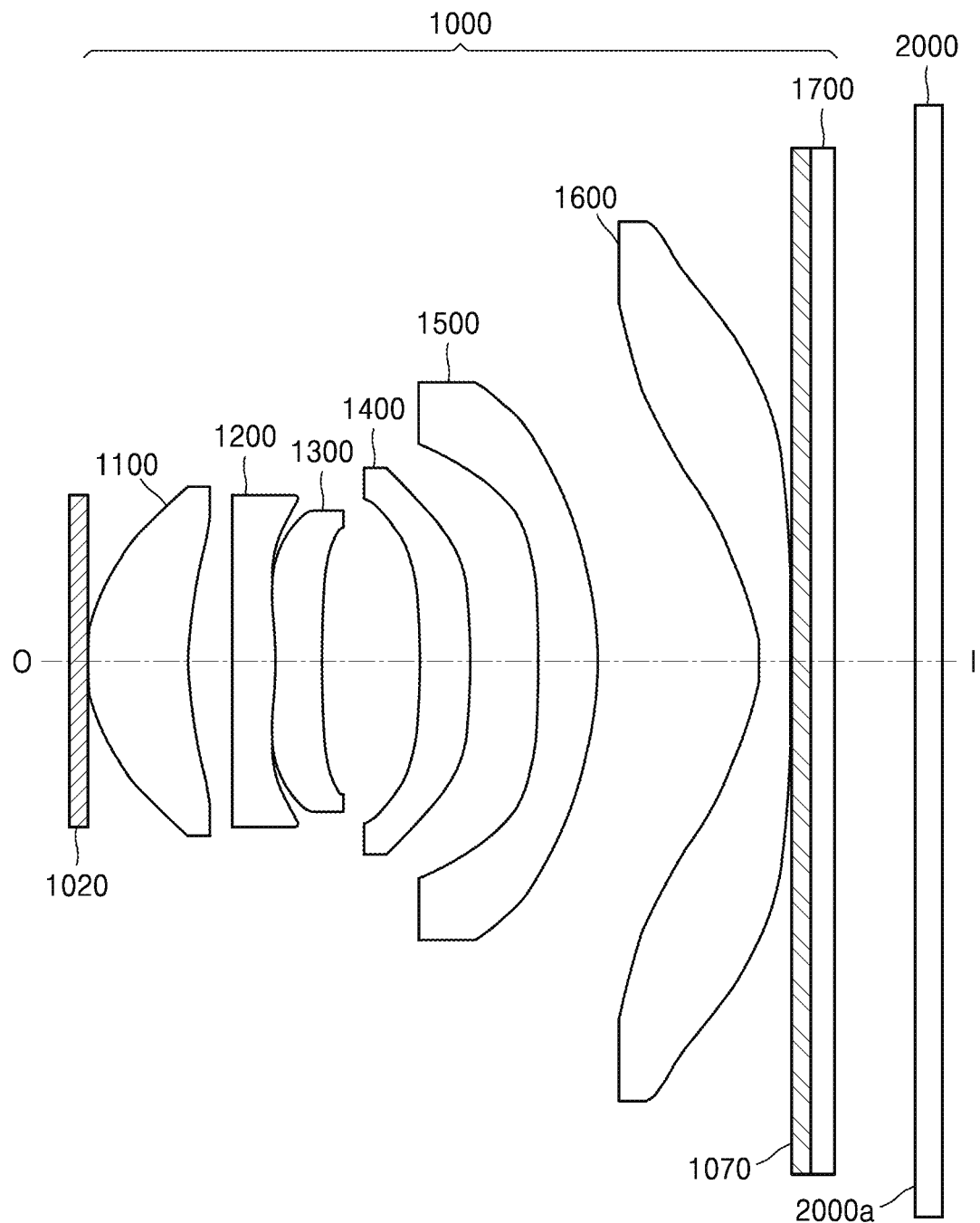

FIGS. 14 and 15 illustrate optical configurations of an imaging optics 1000 to which the meta-lens 100 is applied and an imaging device in which the imaging optics 1000 is applied as an imaging lens, according to an example embodiment.

Referring to FIGS. 14 and 15, the imaging device may include an imaging optics 1000 constituting an imaging lens and an image sensor 2000 that converts an optical image of an object OBJ formed by the imaging optics 1000 into an electrical image signal. An optical filter 1700 such as an infrared-cut filter may be further provided between the imaging optics 1000 and the image sensor 2000.

The imaging optics 1000 may include a plurality of lenses including at least one meta-lens. For example, the imaging optics 1000 may include at least one meta-lens and at least one refractive lens. In addition, the imaging optics 1000 may be composed of only a plurality of meta-lenses without a refractive lens.

FIGS. 14 and 15 illustrate embodiments in which the imaging optics 1000 includes first and second meta-lenses 1020 and 1070 and a plurality of refractive lenses, for example, first to sixth lenses 1100, 1200, 1300, 1400, 1500, and 160 by way of examples. In the imaging optics 1000 according to the example embodiment, the number of meta-lenses, the number of refractive lenses, and an arrangement thereof are not limited thereto, and various embodiments may be implemented.

When the imaging optics 1000 according to the example embodiment includes the first and second meta-lenses 1020 and 1070 as illustrated in FIGS. 14 and 15, the first meta-lens 1020 may include the meta-lens 100 according to the example described above, and the second meta-lens 1070 may include a meta-lens serving only as a lens. For example, the first meta-lens 1020 may include the meta-lens 100 according to the examples of FIGS. 1 and 2 to serve as a lens and to serve to form a plurality of spots with different brightness peak values in an asymmetric distribution. In addition, the second meta-lens 1070 may have only a configuration corresponding to the meta-layer 101 in the meta-lens 100 described with reference to FIG. 2 to serve as a lens.

Figure 16:
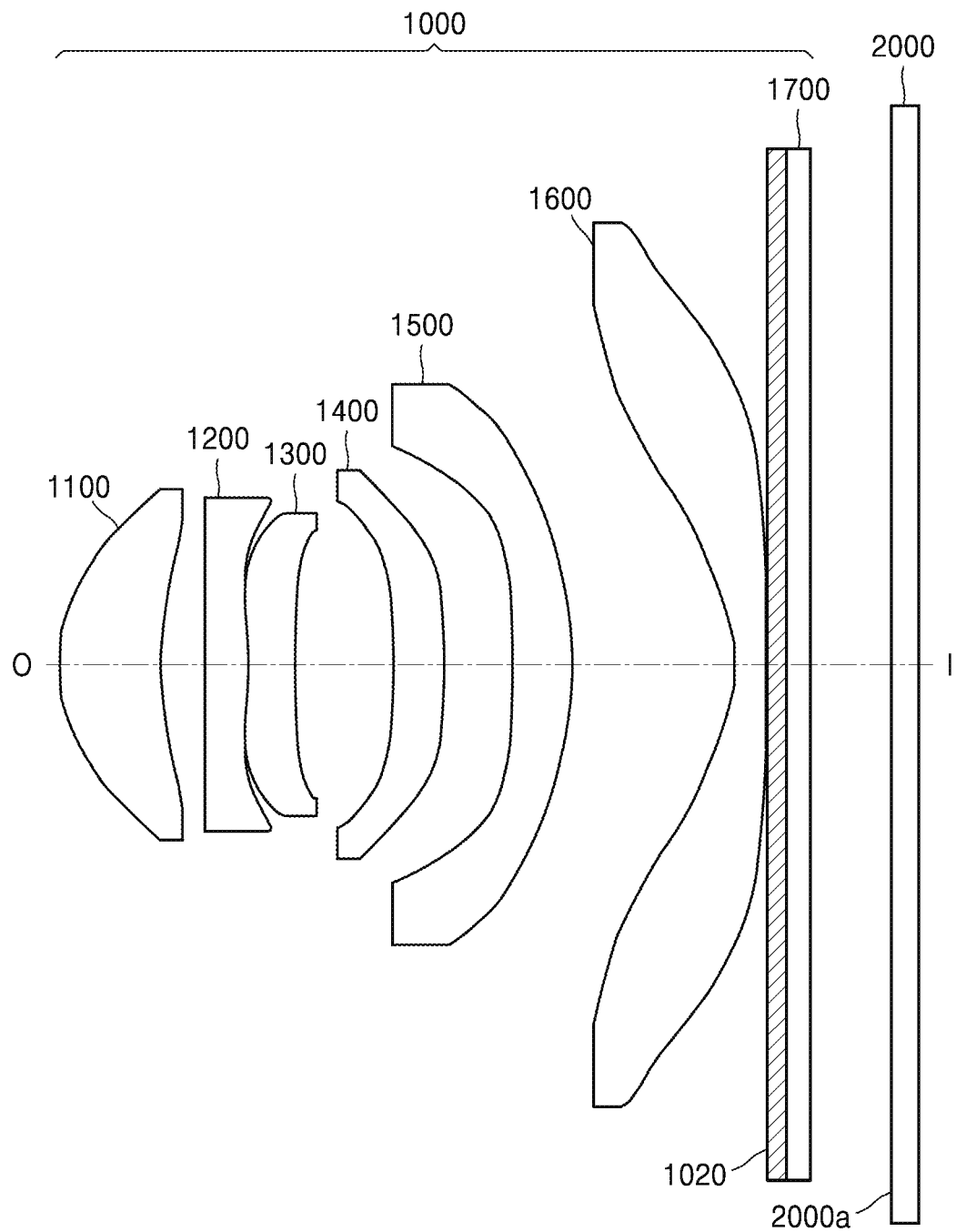

In addition, the first meta-lens 1020 may also be provide in an intermediate portion of the imaging optics 1000, an input end thereof, or the last end thereof. The first meta-lens 1020 may be arranged between the first lens 1100 and the second lens 1200 as illustrated in FIG. 14. In addition, the first meta-lens 1020 may be arranged at a preset position between the second lens 1200 to the sixth lens 1600. In addition, the first meta-lens 1020 may be arranged at an input end of the imaging optics 1000 as illustrated in FIG. 15. In addition, the first meta-lens 1020 may be arranged at the last end of the imaging optics 1000 as illustrated in FIG. 16 to be described below.

FIG. 14 illustrates an example in which the first meta-lens 1020 is placed between the plurality of refractive lenses, for example, between the first lens 1100 and the second lens 1200, and the second meta-lens 1070 is placed at the last end of the imaging optics 1000. FIG. 15 illustrates an example in which the first meta-lens 1020 is placed in the input end of the imaging optics 1000, and the second meta-lens 1070 is placed in the last end of the imaging optics 1000. The second meta-lens 1070 may be arranged before the last end of the imaging optics 1000. In addition, a position of the first meta-lens 1020 may be interchanged with a position of the second meta-lens 1070.

As illustrated in FIGS. 14 and 15, the imaging optics 1000 according to the example embodiment may include the first and second meta-lenses 1020 and 1070, but the example embodiments are not limited thereto.

For example, the imaging optics 1000 according to the example embodiment may have a structure including only the first meta-lens 1020 without the second meta-lens 1070. For example, the imaging optics 1000 according to the example embodiment may have a structure excluding the second meta-lens 1070 in FIGS. 14 and 15. In addition, the imaging optics 1000 according to the example embodiment may have a structure including the first meta-lens 1020 at the last end of the imaging optics 1000 without the second meta-lens 1070 as illustrated in FIG. 16.

As such, when the imaging optics 1000 according to the example embodiment has a structure including only the first meta-lens 1020 without the second meta-lens 1070, the first meta-lens 1020 may be placed in any one of an input end of the imaging optics 1000, an intermediate portion of a plurality of refractive lenses, and the last end of the imaging optics 1000.

In another example, the imaging optics 1000 according to the example embodiment may also have a structure including the first meta-lens 1020 and a plurality of second meta-lenses 1070, and the first meta-lens 1020 and the plurality of second meta-lens 1070 may be arranged in various ways.

In addition, FIGS. 14 to 16 illustrate examples in which the imaging optics 1000 according to the example embodiment includes a plurality of refractive lenses, that is, the first to sixth lenses 1100, 1200, 1300, 1400, 1500, and 1600, and embodiments are not limited thereto. The number of meta-lenses or the number of refractive lenses included in the imaging optics 1000 according to the example embodiment may change depending on design conditions of an imaging device.

In addition, referring to FIGS. 14 and 15, for example, the first lens 1100, the second lens 1200, the fourth lens 1400, and the fifth lens 1500 may have a positive refractive power, and the third lens 1300 and the sixth lens 1600 may have a negative refractive power. A lens with a positive refractive power is a lens based on a principle of a convex lens having a positive focal length and may transmit therethrough light incident parallel to an optical axis O-I and collect the light. In addition, a lens with a negative refractive power is a lens based on a principle of a concave lens and may transmit therethrough light incident parallel and disperse the light.

A surface of the first lens 1100 facing an object side O may be convex, and a surface of the first lens 1100 facing an image side I may be concave. A meniscus lens in which the surface facing the image side I is concave may improve coma aberration and astigmatism that is a phenomenon in which light passing through a marginal portion of the lens does not form a clear image. The first lens 1100 may include a large-diameter lens having a larger effective radius of a surface facing the object side O than the second to third lenses 1200 and 1300. The large-diameter first lens 1100 having a short focal length may satisfy spatial constraints required by an optical device and/or an electronic device and may cause an imaging optics to have a short overall length by providing a strong positive refractive power. Through this, the first lens 1100 may increase resolution of an image or a video imaged by a light ray passing through the marginal portion and may reduce a passing path of the light.

As illustrated in FIG. 14, when the first meta-lens 1020 is arranged between the first lens 1100 and the second lens 1200, the second lens 1200 may be configured as a lens in which the first meta-lens 1020 is combined with the object side O. In another example, the first meta-lens 1020 may be independently arranged without being combined with a refractive lens such as the second lens 1200. In addition, when the first meta-lens 1020 is arranged between the first lens 1100 and the second lens 1200, the first meta-lens 1020 may be designed to correct optical aberrations such as geometric aberration and chromatic aberration occurring in a refractive lens such as the first lens 1100.

As illustrated in FIG. 15, even when the first meta-lens 1020 is arranged at the front end of the first lens 1100, the first meta-lens 1020 may be designed to correct optical aberration such as geometric aberration and chromatic aberration occurring in a refractive lens such as the first lens 1100.

For example, the first meta-lens 1020 may be provided to have an arrangement of a plurality of nanostructures to have a positive refractive power, and form the same phase transmittance profile for light of a plurality of different wavelengths passing therethrough or a monotonically changing phase transmittance profile, and form a plurality of spots with different brightness peak values in an asymmetric distribution on an imaging plane of the imaging optics 1000.

The first lens 1100 provides a strong positive refractive power, and also generates positive chromatic aberration in which long-wavelength light has a longer focal length compared to short-wavelength light. The first meta-lens 1020 may be provided to have negative chromatic aberration, thereby correcting part or all of the chromatic aberration generated by the first lens 1100. In general, a lens with a negative refractive power, such as a flint lens, is used to correct chromatic aberration, and a problem that a refractive power is lost and a thickness of an imaging optics is increased due to the lens may be solved by applying the first meta-lens 1020. The second lens 1100 may be configured to as a lens having a surface facing the image side I having a convex center.

A surface of the third lens 1300 facing the image side I and a surface of the fourth lens 1400 facing the object side O may be concave. In other words, the third and fourth lenses 1300 and 1400 having concave surfaces facing each other may be arranged behind the second lens 1200. The third lens 1300 may compensate for spherical aberration caused by the first lens 1100 having a large diameter by providing a negative refractive power.

Surfaces of the fifth lens 1500 and the sixth lens 1600 facing the object side O may be concave, and surfaces thereof facing the image side I may be convex. The sixth lens 1600 may provide an appropriate negative refractive power and may cause light rays passing through a marginal portion of the lens to be incident on the imaging plane 2000a. In addition, a negative refractive power of the sixth lens 1600 may correct chromatic aberration and curvature of field generated by other lenses. A surface of the sixth lens 1600 toward the object side O and/or a surface of the sixth lens 1600 toward the image side I may be an aspheric surface, which may reduce a phenomenon in which light rays are distorted when passing through a marginal portion of the lens.

Not only the surface of the sixth lens 1600 but also one of the surfaces of the first lens 1100 to the fifth lens 1500 or a plurality of surfaces may also be formed as aspheric surfaces. The spherical aberration generated by the first lens 1100 may be corrected by at least one aspheric surface implemented as one or a plurality of surfaces of the first lens 1100 to the sixth lens 1600.

Referring to FIGS. 14 and 15, the second meta-lens 1070 allows light incident on the imaging plane 2000a of the image sensor 2000 to have a small inclination with respect to the optical axis O-I, and also may be designed to correct chromatic aberration in a lateral direction (a direction orthogonal to an optical axis). The second meta-lens 1070 may have a plurality of nanostructures arranged to have a refractive index distribution and may generate the same phase transmittance profile or a monotonically changing phase transmittance profile for light of at least two different wavelengths. The amount of light in the periphery of the image sensor 2000 may be obtained by the second meta-lens 1070, and thus, an object image with good brightness may be obtained even in low illumination.

The optical filter 1700 may include, for example, an infrared-cut filter. The optical filter 1700 may include a low pass filter and/or a cover glass and may prevent infrared light from being transferred to the imaging plane 2000a of the image sensor 2000 by transmitting visible light therethrough but blocking infrared light. In another example, the optical filter 1700 may selectively transmit only a partial wavelength of the incident light therethrough to make color of an image detected and imaged by the image sensor 2000 similar to a desired color.

Intervals between the lenses 1020, 1070, 1100, 1200, 1300, 1400, 1500, and 1600 may be designed in various ways depending on optical characteristics (aberration characteristics, wide-angle characteristics, and/or brightness characteristics) required for the imaging optics 1000. When it is desired to make an optical device and/or an electronic device small in size, it is advantageous to reduce the overall length (the total length of the imaging optics in an optical axis direction) of the imaging optics 1000 by reducing a distance between the lenses. However, reducing the overall length of the imaging optics 1000 while maintaining an appropriate telephoto ratio may have a physical limitation.

The imaging optics 1000 may further include a diaphragm. The diaphragm may be arranged at various positions, and a plurality of diaphragms may also be provided. For example, the diaphragm may be arranged in front of a surface facing the image side I of the first lens 1100 to control the amount of light reaching the imaging plane 2000a of the image sensor 2000.

One or a plurality of lenses of the first lens 1100 to the sixth lens 1600 may include a surface having an inflection point. The inflection point may represent a point at which a sign of a radius of curvature changes from + to − or from − to +, in other words, a point at which a shape of a lens changes from convex to concave or from concave to convex. The radius of curvature may represent a value indicating a degree of curvature at each point located on a curved surface or a curved line. The sign of the radius of curvature may be defined as + when a shape facing the object side O is convex and when a shape facing the image side I is concave, and the sign of the radius of curvature may be defined as − when a shape facing the object side O is concave and when a shape facing the image side I is convex.

In addition, in FIGS. 14 and 15, a position of the first meta-lens 1020 may be changed and may be interchanged with a position of the second meta-lens 1070. In addition, in FIGS. 14 and 15, a plurality of second meta-lenses 1070 may be provided. In addition, in FIGS. 14 to 15, the second meta-lens 1070 may be excluded. In addition, as illustrated in FIG. 16, the second meta-lens 1070 may be excluded, and the first meta-lens 1020 may be located at the last end of the imaging optics 1000. In addition, the imaging optics 1000 according to the example embodiment may have a structure including the first meta-lens 1020 and at least one second meta-lens 1070 without a refractive lens.

Figure 17:
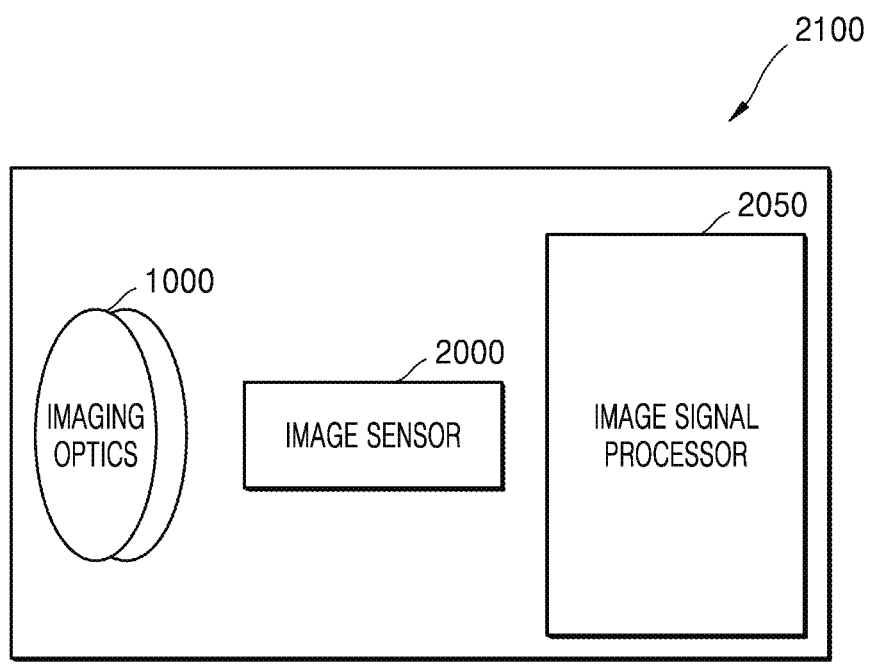
FIG. 17 schematically illustrates an imaging device in which an imaging optics is applied as an imaging lens, according to an example embodiment.

In addition, FIG. 17 schematically illustrates an imaging device 2100 in which the imaging optics 1000 according to the example embodiment described with reference to FIGS. 14 to 16 is applied as an imaging lens.

Referring to FIG. 17, the imaging device 2100 may include the imaging optics 1000, an image sensor 2000, and an image signal processor 2050.

As illustrated in FIGS. 14 to 16, the image sensor 2000 may be arranged at a position on an image plane where an optical image of the object OBJ is formed by the imaging optics 1000.

The image sensor 2000 may include a complementary metal-oxide semiconductor (CMOS), a charge coupled device (CCD), or so on that detects an image of an object and generates an electrical image signal. The image sensor 2000 may also include an array such as a photodiode.

The imaging optics 1000 according to the example embodiment may apply, as the first meta-lens 1020, the meta-lens 100 according to an example embodiment that may form a plurality of spots having the same phase transmittance profile or monotonically changing phase transmittance profile for at least two different wavelengths in the form of different brightness peak values and PSFs in an asymmetric distribution, and images of a plurality of spots with different brightness peak values in an asymmetric distribution may be formed on the imaging plane 2000a of the image sensor 2000 by the imaging optics 1000 according to the example embodiment.

Accordingly, the imaging device 2100 may obtain a plurality of images with different brightness peak values of the imaging optics 1000 from the image sensor 2000 by single shot, thereby obtaining an HDR image, a depth image, or so on by processing a single shot image by the image signal processor (ISP) 2050. The image signal processor 2050 may be integrated into the image sensor 2000.

For example, the image signal processor 2050 may process an image signal detected by the image sensor 2000 to deconvolute an imaging focus shape of the imaging optics 1000 in single shot to obtain an image with a high contrast ratio. That is, the image signal processor 2050 may perform image signal processing of deconvoluting an imaging focus shape of the imaging optics 1000, that is, a PSF with respect to a single shot image of the image sensor 2000 to obtain an HDR image. The degree of spread of the PSF changes for each wavelength depending on the degree of chromatic aberration of the meta-lens 100 according to the example embodiment or the imaging optics 1000 including the meta-lens 100, and thus, when deconvoluting the PSF according to image signal processing, the degree of spread of the PSF for each wavelength may be considered. The image signal processing may be performed by deconvoluting a PSF and by applying an artificial intelligence algorithm-based signal processing technique such as an end-to-end neural network. As described above, the imaging device 2100 implemented to obtain an HDR image may be implemented by various cameras requiring high-contrast image.

In another example, the image signal processor 2050 may perform image signal processing to analyze a three-dimensional shape including a depth position of an object. For example, the image signal processor 2050 may process imaging image signals of a plurality of spots which are formed by the imaging optical system 1000 according to the example embodiment in an asymmetric distribution and have different brightness peak values formed on the imaging plane 2000a of the image sensor 2000 and may accurately analyze a three-dimensional shape including a depth position of an object. That is, information on the same object may be detected from a plurality of spot images with different brightness peak values at the same exposure time by single shot, and thus, a three-dimensional shape including a depth position of an object having various reflectivity may be accurately analyzed. The imaging device 2100 may be implemented as a 3D sensor, and the image sensor 2000 and the image signal processor 2050 may operate in the same manner as a global shutter sensor-based image sensor. The imaging device 2100 may be used as various sensors such as a sensor for augmented reality or virtual reality, and a distance sensor for a vehicle.

As described above, the imaging optics 1000 according to the example embodiment may form images of a plurality of spots with different brightness peak values in an asymmetric distribution, and thus, a plurality of still images with different brightness peak values for the same scene may be obtained at the same exposure time by single shot. In this case, since there is no movement of an object between the plurality of still images, and thus, a motion artifact (ghost artifact) due to movement of an object does not occur when an HDR image is obtained. Accordingly, the imaging device 2100 according to the example embodiment may obtain an HDR image without a motion artifact. In addition, information on the same object may be detected from a plurality of spot images with different brightness peak values at the same exposure time by single shot, and thus, a three-dimensional shape including a depth position of an object having various reflectivity or distance information may be accurately analyzed.

The imaging device 2100 according to this embodiment may implement a device for maximizing single-shot HDR performance. In addition, a device capable of accurately analyzing a depth image of an object with various reflectivity may be implemented. The imaging optics 1000 to which the meta-lens 100 according to the example embodiment is applied and the imaging device 2100 including the imaging optics 1000 may be mounted on various electronic devices (an optical device and so on) to be used. In addition to the image sensor 2000 and the image signal processor 2050, the electronic device may further include an application processor (AP) to control a plurality of hardware components or software components connected to the application processor (AP) by driving an operating system or an application program through the application processor (AP) and to perform various data processing and operations. The application processor (AP) may further include a graphic processing unit (GPU). When the image signal processor 2050 is included in the application processor AP, the image (or a video) obtained by the image sensor 2000 may be stored and/or output by using the application processor (AP).

As described above, the imaging optics 1000 to which the meta-lens 100 according to the example embodiment is applied and the imaging device 2100 including the imaging optics 1000 may be applied to various electronic devices. For example, the imaging device 2100 may be implemented by a separate camera. In addition, the imaging device 2100 may be mounted on electronic devices such as a smartphone, a wearable device, an Internet of things (IoT) device, a home appliance, a tablet personal computer (PC), a personal digital assistant (PDA), a portable multimedia player (PMP), a navigation, a drone, a robot, an unmanned vehicle, an autonomous vehicle, and an advanced driver assistance systems (ADAS).

Figure 18:
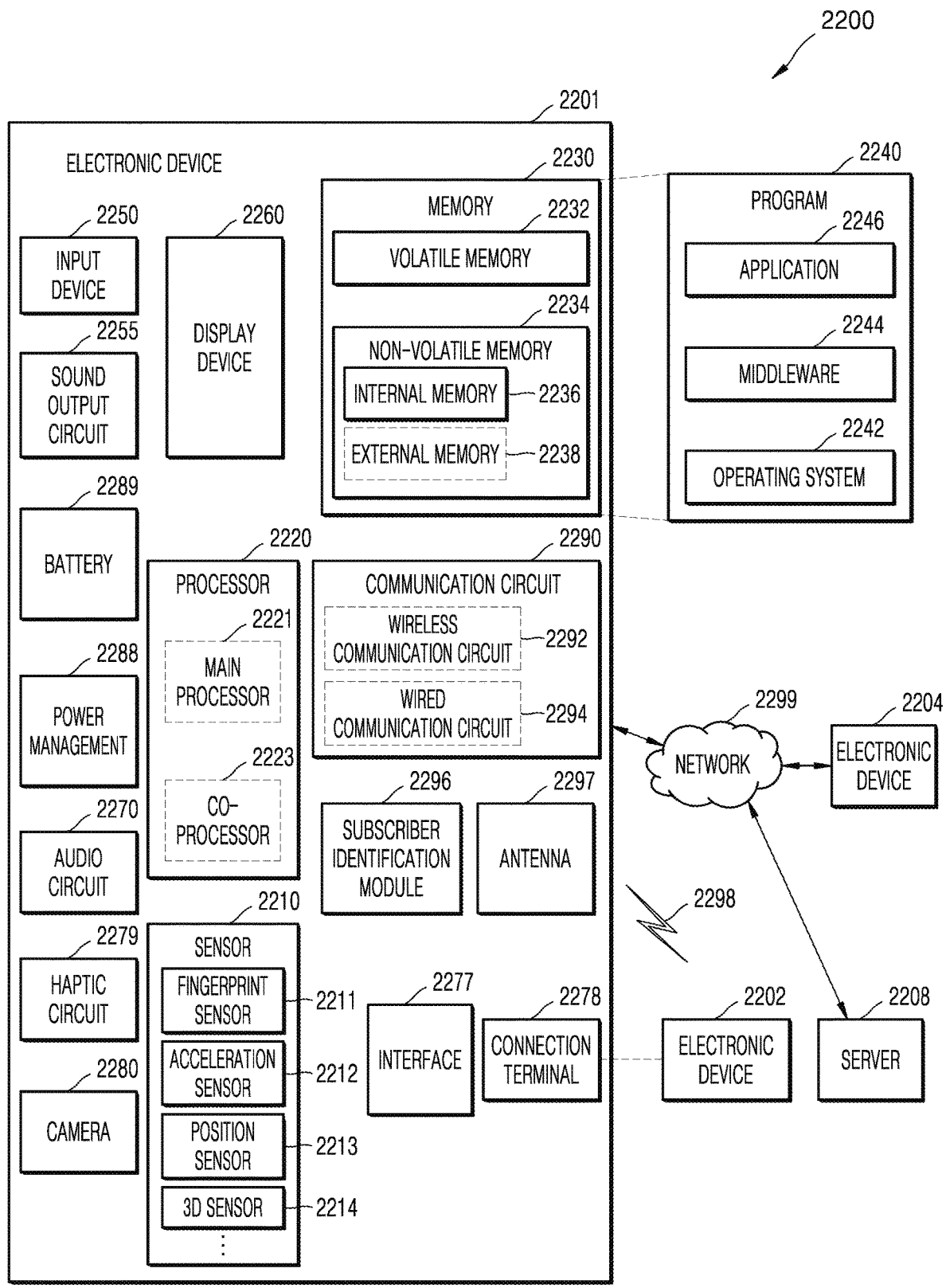
FIG. 18 is a block diagram illustrating a schematic configuration of an electronic device according to an example embodiment.

FIG. 18 is a block diagram illustrating a schematic configuration of an electronic device according to an example embodiment.

Referring to FIG. 18, in the network environment 2200, the electronic device 2201 may communicate with another electronic device 2202 through a first network 2298 (a short-range wireless communication network or so on) or may communicate with another electronic device 2204 and/or a server 2208 through a second network 2299 (a long-distance wireless communication network or so on). The electronic device 2201 may communicate with the electronic device 2204 through the server 2208. The electronic device 2201 may include a processor 2220, a memory 2230, an input device 2250, a sound output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. Some (the display device 2260 and so on) of the components may be omitted from the electronic device 2201, or other components may be added to the electronic device 2201. Some of the components may be integrated in one circuit. For example, a fingerprint sensor 2211, an iris sensor, an illuminance sensor, or so on of the sensor module 2210 may be embedded in the display device 2260 (a display or so on). In addition, each of the camera module 2280, the haptic module 2279, and the sensor module 2210 may include some of the processor 2220 and the memory 2230.

The processor 2220 may execute software (such as a program 2240) to control one or a plurality of other components (hardware, software components, and so on) of the electronic device 2201 connected to the processor 2220 and may perform various data processing or arithmetic. The processor 2220 stores commands and/or data received from other components (the sensor module 2210, the communication module 2290, and so on) in a volatile memory 2232 and process the commands and/or the data stored in the volatile memory 2232 and store resulting data in a non-volatile memory 2234 as part of data processing or arithmetic. The processor 2220 may include a main processor 2221 (a central processing unit, an application processor, or so on) and a co-processor 2223 (a graphics processing unit, an image signal processor, a sensor hub processor, a communication processor, or so on) that may be operated independently or together therewith. The co-processor 2223 may use less power than the main processor 2221 and may perform a specialized function.

The co-processor 2223 may control functions and/or states related to some components (the display device 2260, the sensor module 2210, the communication module 2290, and so on) of the electronic device 2201 on behalf of the main processor 2221 while the main processor 2221 is in an inactive state (sleep state), or together with the main processor 2221 while the main processor 2221 is in an active state (the application execution state). The co-processor 2223 (an image signal processor, a communication processor, or so on) may be implemented as part of another component (the camera module 2280, the communication module 2290, or so on) functionally related thereto.

The memory 2230 may store a variety of data required by components (the processor 2220, the sensor module 2210, and so on) of the electronic device 2201. Data may include, for example, input data and/or output data for software (such as the program 2240) and commands related thereto. The memory 2230 may include the volatile memory 2232 and/or the non-volatile memory 2234.

The program 2240 may be stored as software in the memory 2230 and may include an operating system 2242, middleware 2244, and/or an application 2246.

The input device 2250 may receive commands and/or data to be used in components (the processor 2220 and so on) of the electronic device 2201 from an exterior (a user or so on) of the electronic device 2201. The input device 2250 may include a microphone, a mouse, a keyboard, and/or a digital pen (a stylus pen or so on).

The sound output device 2255 may output a sound signal to the exterior of the electronic device 2201. The sound output device 2255 may include a speaker and/or a receiver. The speaker may be used for general purposes such as multimedia playback or recording playback, and the receiver may be used to receive incoming calls. The receiver may be integrated into the speaker as part of the speaker or may be implemented as an independent separate device.

The display device 2260 may visually provide information to the exterior of the electronic device 2201. The display device 2260 may include a display, a hologram device, or a control circuit for controlling a projector and a device related thereto. The display device 2260 may include touch circuitry configured to detect a touch, and/or sensor circuitry configured to measure the intensity of force generated by the touch (a pressure sensor or so on).

The audio module 2270 may convert audio into an electrical signal or may convert an electrical signal into audio. The audio module 2270 may obtain audio through the input device 2250 or may output audio through a speaker and/or a headphone of the sound output device 2255, and/or another electronic device (the electronic device 2202) directly or wirelessly connected to the electronic device 2201.

The sensor module 2210 may detect an operation state (power, temperature, and so on) of the electronic device 2201 or an external environmental state (user state or so on) and may generate an electrical signal and/or a data value corresponding to the detected state. The sensor module 2210 may include a fingerprint sensor 2211, an acceleration sensor 2212, a position sensor 2213, a three-dimensional (3D) sensor 2214, and so on, and further include an iris sensor, a gyro sensor, an atmospheric pressure sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 may emit light to an object and analyze the light reflected from the object to detect a shape, movement, and so on of the object, and for example, the imaging optics 1000 according to various embodiments including the meta-lens 100 according to the example embodiment described above and an imaging device including the imaging optics 1000 may be applied thereto.

The interface 2277 may support one or more designated protocols that may be used for the electronic device 2201 to be connected directly or wirelessly to another electronic device (the electronic device 2202 or so on). The interface 2277 may include a high-definition multimedia interface (HDMI), a Universal Serial Bus (USB) interface, a secure digital (SD) card interface, and/or an audio interface.

A connection terminal 2278 may include a connector through which the electronic device 2201 may be physically connected to another electronic device (for example, the electronic device 2202). The connection terminal 2278 may include an HDMI connector, a USB connector, an SD card connector, and/or an audio connector (a headphone connector or so on).

The haptic module 2279 may convert an electrical signal into a mechanical stimulus (vibration, movement, or so on) or an electrical stimulus that a user may perceive through a tactile or motion sense. The haptic module 2279 may include a motor, a piezoelectric effect element, and/or an electrical stimulation element.

Figure 19:
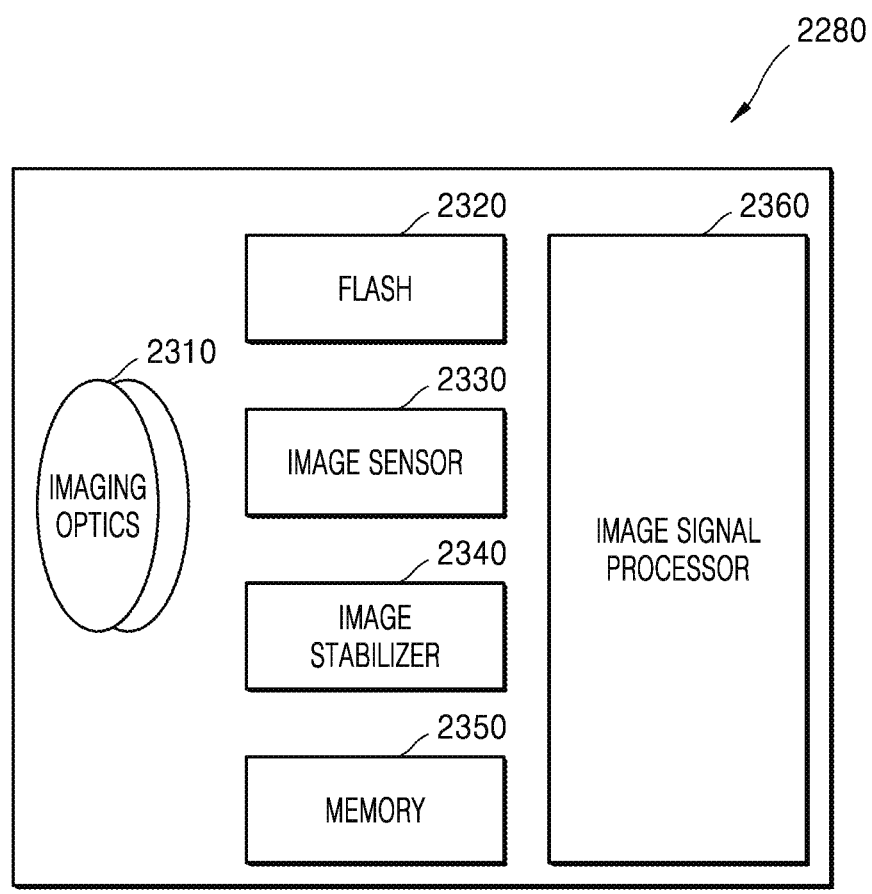
FIG. 19 is a block diagram illustrating an example of a schematic configuration of a camera module included in the electronic device of FIG. 18.

The camera module 2280 may capture a still image and a video. As illustrated in FIG. 19, the camera module 2280 may include an imaging optics 2310 including one or more lenses, image sensors 2330, image signal processors 2360, and/or flashes 2320. The imaging optics 2310 included in the camera module 2280 may collect light emitted from an object which is an imaging target, and the imaging optics 1000 according to various embodiments including the meta-lens 100 according to the example embodiment described above may be applied to the imaging optics 2310.

The power management module 2288 may manage power supplied to the electronic device 2201. The power management module 2288 may be implemented as part of a power management integrated circuit (PMIC).

The battery 2289 may supply power to configuration elements of the electronic device 2201. The battery 2289 may include a non-rechargeable primary cell, a rechargeable secondary cell, and/or a fuel cell.

The communication module 2290 may establish a direct (wired) communication channel and/or a wireless communication channel between the electronic device 2201 and another electronic device (the electronic device 2202, the electronic device 2204, the server 2208, or so on), and may support communication through the established communication channel. The communication module 2290 may operate independently of the processor 2220 (application processor or so on) and may include one or more communication processors that support direct communication and/or wireless communication. The communication module 2290 may include a wireless communication module 2292 (a cellular communication module, a short-range wireless communication module, a global navigation satellite system (GNSS) communication module, or so on) and/or a wired communication module 2294 (a Local Area Network (LAN) communication module, a power line communication module, or so on). One of the communication modules may communicate with another electronic device through the first network 2298 (a short-range communication network such as Bluetooth, WiFi Direct, or infrared data association (IrDA)) or the second network 2299 (a telecommunication network such as a cellular network, the Internet, or a computer network (a LAN, a wide area network (WAN), or so on)). Various types of these communication modules may be integrated into one configuration element (a single chip or so on) or may be implemented as a plurality of separate configuration elements (multiple chips). The wireless communication module 2292 may check and authenticate the electronic device 2201 in a communication network such as the first network 2298 and/or the second network 2299 by using subscriber information (international mobile subscriber identifier (IMSI) and so on) stored in the subscriber identification module 2296.

The antenna module 2297 may transmit a signal and/or power to the outside (other electronic devices or so on) or may receive a signal from the outside. An antenna may include a radiator made of a conductive pattern formed on a substrate (a printed circuit board (PCB) or so on). The antenna module 2297 may include one or a plurality of antennas. When a plurality of antennas are included, an antenna suitable for a communication method used in a communication network such as the first network 2298 and/or the second network 2299 may be selected from among the plurality of antennas by the communication module 2290. A signal and/or power may be transmitted or received between the communication module 2290 and other electronic devices through the selected antenna. In addition to the antenna, other components (a radio frequency integrated circuit (RFIC) and so on) may be included as some of the antenna module 2297.

Some of the configuration elements may be connected to each other through a communication method (a bus, general purpose input and output (GPIO), serial peripheral interface (SPI), mobile industry processor interface (MIPI), or so on) between peripheral devices and may exchange signals (commands, data, and so on).

A command or data may be transmitted or received between the electronic device 2201 and the electronic device 2204, which is external, through the server 2208 connected to the second network 2299. The other electronic devices 2202 and 2204 may be the same devices as or different types of devices from the electronic device 2201. All or some of operations performed by the electronic device 2201 may be performed by one or more of the other electronic devices 2202, 2204, and 2208. For example, when the electronic device 2201 needs to perform a function or service, the electronic device may request one or more other electronic devices to perform the function or part or all of the service, instead of performing the function or service by itself. One or more other electronic devices that receive a request may perform an additional function or service related to the request and may transmit a performance result to the electronic device 2201. To this end, cloud computing technology, distributed computing technology, and/or client-server computing technology may be used.

FIG. 19 is a block diagram illustrating a schematic configuration of the camera module 2280 included in the electronic device of FIG. 18.

Referring to FIG. 19, the camera module 2280 includes the imaging optics 2310, the flash 2320, the image sensor 2330, an image stabilizer 2340, a memory 2350 (a buffer memory or so on), and/or the image signal processor 2360. The imaging optics 2310 may collect light emitted from an object which is an imaging target and may include the meta-lens 100 according to the example embodiment described above and at least one meta-lens.

The imaging optics 2310 may include at least one meta-lens, and one or more refractive lenses, including the meta-lens 100 according to the example embodiment. For example, the imaging optics 1000 according to various embodiments including the meta-lens 100 according to the example embodiment described above may be applied to the imaging optics 2310. The imaging optics 2310 including the meta-lens 100 according to the example embodiment may implement desired optical performance and have a short optical overall length and form images of a plurality of spots with different brightness peak values in an asymmetric distribution.

The camera module 2280 may further include an actuator. The actuator may drive positions of lens elements constituting the imaging optics 2310 and adjust a distance between the lens elements to perform zooming and/or autofocus (AF).

The camera module 2280 may include a plurality of imaging optics 2310, and in this case, the camera module 2280 may serve as a dual camera, a 360-degree camera, or a spherical camera. Some of the plurality of imaging optics 2310 may have the same lens property (an angle of view, a focal length, an auto focus, an F number, optical zoom, and so on) or may have different lens properties. The imaging optics 2310 may include at least one of a wide-angle lens, a telephoto lens, and an ultra-wide-angle lens.

The flash 2320 may emit light used to enhance light emitted or reflected from an object. The flash 2320 may include one or more light emitting diodes (LEDs) (a red-green-blue (RGB) LED, a white LED, an infrared LED, an ultraviolet LED, and so on), a xenon lamp, and/or one or more laser diodes. The image sensor 2330 may obtain an image corresponding to an object by converting light emitted or reflected from the object and transmitted through the imaging optics 2310 into an electrical signal. The image sensor 2330 may include one or more sensors selected from image sensors with different properties, such as an RGB sensor, a black and white (BW) sensor, an infrared (IR) sensor, and an ultraviolet (UV) sensor. Each of the sensors included in the image sensor 2330 may include a charged coupled device (CCD) sensor and/or a complementary metal oxide semiconductor (CMOS) sensor.

In response to movement of the camera module 2280 or the electronic device 2201 including the camera module 2280, the image stabilizer 2340 moves one or more lenses included in the imaging optics 2310 or the image sensor 2330 in a preset direction, or controls (adjusts a read-out timing or so on) operating characteristics of the image sensor 2330 to reduce a negative influence of the movement. The image stabilizer 2340 may detect movement of the camera module 2280 or the electronic device 2201 by using a gyro sensor or an acceleration sensor located inside or outside the camera module 2280. The image stabilizer 2340 may be implemented optically.

The memory 2350 may store some or all data of images obtained by the image sensor 2330 to perform a subsequent image processing operation. For example, when a plurality of images are obtained at a high speed, the obtained original data (Bayer-patterned data, high-resolution data, and so on) is stored in the memory 2350, only low-resolution images are displayed, and then original data of a selected (selected by a user or so on) image is transmitted to the image signal processor 2360. The memory 2350 may be integrated into the memory 2230 of the electronic device 2201 or may be configured as a separate memory that independently operates.

The image signal processor 2360 may perform image processing once or more for an image obtained by the image sensor 2330 or image data stored in the memory 2350. The image processing may include generation of an HDR image, generation of a depth map, three-dimensional modeling, generation of a panorama, extraction of feature points, image synthesizing, and/or image compensation (noise reduction, resolution adjustment, brightness adjustment, and blurring), sharpening, softening, and so on. The imaging optics 2310 may form images of a plurality of spots with different brightness peak values in an asymmetric distribution on an imaging plane, and thus, the image signal processor 2360 may process an image signal input from the image sensor 2330 to obtain a plurality of still images with different brightness peak values for the same scene at the same exposure time by single shot and obtain an HDR image therefrom.

The image signal processor 2360 may control (controls exposure time, controls read-out timing, and so on) components (for example, the image sensor 2330 and so on) included in the camera module 2280. An image processed by the image signal processor 2360 may be stored back in the memory 2350 for further processing or may be provided to external components of the camera module 2280 (the memory 2230, the display device 2260, the electronic device 2202, the electronic device 2204, the server 2208, and so on). The image signal processor 2360 may be integrated into the processor 2220 or may be configured as a separate processor that operates independently of the processor 2220. When the image signal processor 2360 is configured as a processor independent of the processor 2220, an image processed by the image signal processor 2360 may be subjected to additional image processing by the processor 2220 and then displayed on the display device 2260.

The electronic device 2201 may include a plurality of camera modules 2280 with different properties or functions. In this case, the plurality of camera modules 2280 may include one or more of a wide-angle camera, a telephoto camera, and an ultra-wide-angle camera. Similarly, one of the plurality of camera modules 2280 may include a front camera and the others may include a rear camera.

The camera modules 2280 may be mounted on various electronic devices. For example, the camera modules 2280 may be mounted on electronic devices such as a smartphone, a wearable device, an Internet of things (IoT) device, a home appliance, a tablet personal computer (PC), a personal digital assistant (PDA), a portable multimedia player (PMP), a navigation, a drone, and an advanced driver assistance system (ADAS).

Figure 20:
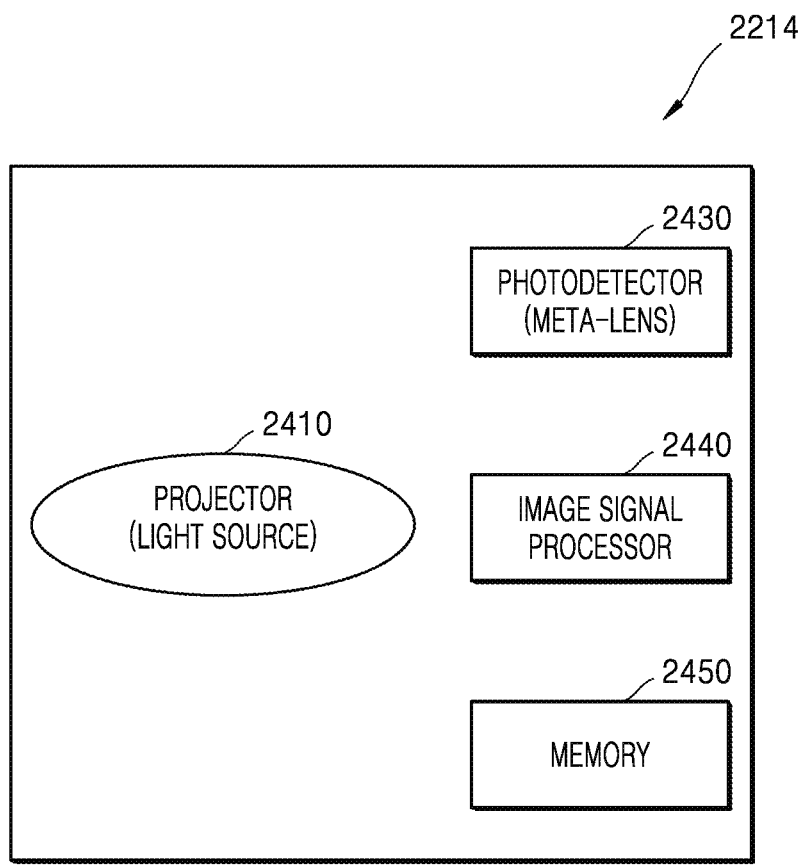
FIG. 20 is a block diagram illustrating a schematic configuration of a three-dimensional (3D) sensor provided in the electronic device of FIG. 18.

FIG. 20 is a block diagram illustrating a schematic configuration of the 3D sensor 2214 provided in the electronic device of FIG. 18.

The 3D sensor 2214 of FIG. 20 may be applied as, for example, a global shutter-based imaging sensor. For example, the 3D sensor 2214 of FIG. 20 may be applied as a sensor for augmented reality or virtual reality, or a distance sensor for a vehicle.

The 3D sensor 2214 may detect a shape, movement, and so on of an object by emitting preset light to the object and receiving and analyzing the light reflected from the object. The 3D sensor 2214 may include a projector 2410, a photodetector 2430, an image signal processor 2440, and a memory 2450. The 3D sensor 2214 may also include a signal processing unit instead of the image signal processor 2440.

The projector 2410 may emit light to be used to analyze a shape or a position of an object. The projector 2410 may have an optical configuration including a light source that generates and emits light with a small wavelength. The projector 2410 may be a light source itself. The light source may include a laser diode (LD), a light emitting diode (LED), a super luminescent diode (SLD), or so on that emits light of a wavelength band suitable for analyzing a position and a shape of an object, for example, light with an infrared band wavelength. The light source may include a wavelength tunable laser diode. The light source may generate and emit lights of different wavelength bands. The lights of different wavelength bands may each have a narrow bandwidth, for example, a bandwidth less than or equal to 10 nm or less than or equal to 5 nm. The light source may generate and emit pulse light or continuous light. The photodetector 2430 receives the reflected light of light applied to an object from the projector 2410. The photodetector 2430 may include an array of a plurality of sensors for detecting light or may include only one sensor. For example, the photodetector 2430 may include an image sensor. In addition, the photodetector 2430 may further include the meta-lens 100 according to the example embodiment or an imaging optics including the meta-lens 100. In this way, when the meta-lens 100 according to the example embodiment is applied to the photodetector 2430, images of a plurality of spots with different brightness peak values in an asymmetric distribution may be formed on an imaging plane, that is, a sensing surface of the photodetector 2430.

The image signal processor 2440 may analyze a shape and so on of an object by processing the signal detected by the photodetector 2430. The image signal processor 2440 processes an image signal input from the photodetector 2430 to detect information on the same object at the same exposure time by single shot as images of a plurality of spots with different brightness peak values, thereby, accurately analyzing a three-dimensional shape including a depth position of an object with various reflectivity. An image sensor of the photodetector 2430 and the image signal processor 2440 may operate in the same manner as a global shutter sensor-based image sensor.

Calculation for measuring time of flight of light or calculation for measuring structured light may be performed to analyze a 3D shape. For example, various calculation methods may be used to measure the time of flight of light. For example, in a direct time measurement method, a distance is calculated by emitting pulse light to an object and measuring time that light returns after being reflected from an object with a timer. In a correlation method, a distance is calculated by emitting pulse light to an object and measuring brightness of light reflected from the object. In a phase transmittance measurement method, a distance is calculated by emitting continuous wave light such as a sine wave to an object and detecting a phase difference of light reflected from the object. The memory 2450 may store programs and other data necessary for calculation of the image signal processor 2440.

A calculation result of the image signal processor 2440, that is, information on a shape and a position of an object may be transmitted to another unit in the electronic device 2200 or to another electronic device. For example, the information may be used by the application 2246 stored in the memory 2230. Another electronic device to which the calculation result is transmitted may include a display device or a printer that outputs results. In addition, the electronic device may include an autonomous driving device such as an unmanned vehicle, an autonomous vehicle, a robot, and a drone, a smartphone, a smart watch, a mobile phone, a personal digital assistant (PDA), a laptop computer, a personal computer (PC), various wearable devices, other mobile or non-mobile computing devices, or Internet of Things devices but is not limited thereto.

As described above, the meta-lens 100 according to the example embodiment, an imaging optics to which the meta-lens 100 is applied, and an electronic device including the imaging optics are described with reference to the example embodiments illustrated in the drawings, but these are merely examples, and those skilled in the art will understand that various modifications and equivalent other embodiments may be derived therefrom.

A meta-lens according to an example embodiment may form a plurality of spots with different brightness peak values in an asymmetric distribution on an imaging plane, and thus, when an image is obtained by applying the meta-lens to an imaging optics, a plurality of images with different brightness peak values for the same scene may be obtained at the same time by singleshot.

According to an imaging device or an electronic device to which an imaging optics including the meta-lens is applied, an HDR image may be obtained by signal-processing a plurality of images obtained by singleshot, and in this case, there is no movement of an object between the plurality of images, and thus, an HDR image without motion artifact may be obtained.

In addition, according to an imaging device or an electronic device to which an imaging optics including the meta-lens is applied, a plurality of images obtained by single shot have different brightness peak values, and thus, accuracy may be increased when acquiring depth position information on an object with various reflectivity.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A meta-lens comprising:
at least one meta-layer having a plurality of nanostructures, each of the plurality of nanostructures having a dimension less than an operating wavelength,
wherein the plurality of nanostructures are configured to modulate a phase and intensity of incident light to simultaneously form a plurality of spots of different brightness on an imaging plane in an asymmetric distribution,
wherein the plurality of spots formed on the imaging plane include a first spot and a plurality of second spots that are separated from a center of the first spot,
wherein the plurality of second spots have lower illuminance than the first spot, and
wherein the plurality of second spots have different illuminances and are asymmetrically distributed with respect to the first spot.

2. The meta-lens of claim 1, wherein the plurality of second spots include a first second spot having a less brightness peak value than the first spot by about 4 dB to about 10 dB.

3. The meta-lens of claim 2, wherein the plurality of second spots further include a second second spot,
the first second spot and the second second spot are asymmetrically distributed with respect to the first spot, and
a brightness peak value of the second second spot is less than a brightness peak value of the first second spot by about 4 dB to about 10 dB.

4. The meta-lens of claim 1, wherein the meta-lens has a complex amplitude transmittance T(r) satisfying the following equation, $$T(\vec{r}) \propto \left\{ 1 + \sum_{i}^{n} A_i \exp\left(jk\vec{v_i}\cdot\vec{r}\right) \right\} \times T_0(\vec{r})$$

wherein $T_0(r)$ represents a transmittance of a main ray forming the first spot, $A_i$ represents relative transmission amplitude of a sub-ray forming an i-th second spot with respect to the first spot, r represents a radial direction, and $v_i$ represents a direction cosine corresponding to a tilt degree of a propagation direction of the sub-ray, and
wherein $v_i=u_i/f$, wherein $u_i$ is a distance between the first spot and the i-th second spot on the imaging plane, and f is an effective focal length of the meta-lens.

5. The meta-lens of claim 1,
further comprising a transmittance-changing layer is provided to branch a sub-ray forming at least one second spot, among the plurality of second spots, to be tilted with respect to a main ray forming the first spot and modulate intensity of light transmitting therethrough to form the plurality of spots of different brightness on the imaging plane in an asymmetric distribution, and
wherein the at least one meta-layer is further configured to modulate a phase of light transmitting through the at least one meta-layer.

6. The meta-lens of claim 5, wherein the transmittance-changing layer is provided on an upper portion of the at least one meta-layer or a lower portion of the at least one meta-layer.

7. The meta-lens of claim 6, wherein the transmittance-changing layer includes a high energy beam sensitive (HEBS) material layer.

8. The meta-lens of claim 1, wherein the at least one meta-layer comprises a first layer including a plurality of first nanostructures and a first peripheral material surrounding the plurality of first nanostructures, and a second layer including a plurality of second nanostructures and a second peripheral material surrounding the plurality of second nanostructures, the second layer being arranged on the first layer, and
wherein a refractive index of the plurality of first nanostructures is greater than a refractive index of the first peripheral material, and a refractive index of the plurality of second nanostructures is less than a refractive index of the second peripheral material, or the refractive index of the plurality of first nanostructures is less than the refractive index of the first peripheral material, and the refractive index of the plurality of second nanostructures is greater than the refractive index of the second peripheral material, thereby forming a same phase transmittance profile for at least two different wavelengths included in incident light.

9. The meta-lens of claim 1, wherein the at least one meta-layer comprises a first layer including a plurality of first nanostructures and a first peripheral material surrounding the plurality of first nanostructures, and a second layer including a plurality of second nanostructures and a second peripheral material surrounding the plurality of second nanostructures, the second layer being arranged on the first layer, and
the at least one meta-layer includes a first zone in which signs of change rates of an effective refractive index depending on positions are same as each other in the first layer and the second layer, and a second zone in which the signs are opposite to each other in the first layer and the second layer, thereby forming phase transmittance profiles that monotonically change for at least two different wavelengths and have different phase modulation ranges.

10. The meta-lens of claim 9, wherein the first zone is wider than the second zone, wherein the first zone comprises a plurality of first zones and the second zone comprises a plurality of second zones, and
wherein the first zone and the second zone are alternately arranged in one direction.

11. The meta-lens of claim 1, wherein the meta-lens is provided to form a complex amplitude transmittance distribution having a smaller number of carrier spatial frequency components than a number of the plurality of spots at an output end.

12. The meta-lens of claim 11, wherein the plurality of nanostructures are arranged to add a spherical or aspherical transmission phase distribution to a phase distribution having the carrier spatial frequency components.

13. The meta-lens of claim 11, wherein a period of the complex amplitude transmittance distribution is three times or more an operating wavelength.

14. An imaging optics comprising:

a plurality of lenses including a meta-lens, wherein the meta-lens includes at least one meta-layer having a plurality of nanostructures, each of the plurality of nanostructures having a dimension less than an operating wavelength, wherein the plurality of nanostructures are configured to modulate a phase and intensity of incident light to simultaneously form a plurality of spots of different brightness on an imaging plane in an asymmetric distribution, wherein the plurality of spots formed on the imaging plane include a first spot and a plurality of second spots that are separated from a center of the first spot, wherein the plurality of second spots have lower illuminance than the first spot, and wherein the plurality of second spots have different illuminances and are asymmetrically distributed with respect to the first spot.

15. The imaging optics of claim 14, wherein the plurality of lenses include at least one refractive lens, wherein the meta-lens is at least one of a front end, an intermediate portion, or a last end of the imaging optics, wherein the at least one refractive lens includes a first lens having a positive refractive power with respect to incident light from an object side and having a convex surface toward the object side, and wherein the meta-lens has negative chromatic aberration with respect to the incident light passing through the first lens.

16. The imaging optics of claim 14, wherein the meta-lens forms a phase transmittance profile to have a positive refractive power or a negative refractive power.

17. An electronic device comprising:
an imaging optical element; and
an image sensor configured to convert optical images of a plurality of spots of different brightness formed in an asymmetric distribution by the imaging optical element into electrical signals, wherein the imaging optical element includes a plurality of lenses including a meta-lens, wherein the meta-lens includes at least one meta-layer having a plurality of nanostructures, each of the plurality of nanostructures having a dimension less than an operating wavelength, wherein the plurality of nanostructures are configured to modulate a phase and intensity of incident light to simultaneously form the plurality of spots of different brightness on an imaging plane in an asymmetric distribution, wherein the plurality of spots formed on the imaging plane include a first spot and a plurality of second spots that are separated from a center of the first spot, and wherein the plurality of second spots have lower illuminance than the first spot, and wherein the plurality of second spots have different illuminances and are asymmetrically distributed with respect to the first spot.

18. The electronic device of claim 17, further comprising an image signal processor configured to process an image signal detected by the image sensor to deconvolute an imaging focus shape of the imaging optics in single shot and configured to obtain an image with a high contrast ratio.

19. The electronic device of claim 17, wherein the plurality of lenses include at least one refractive lens, wherein the meta-lens is at least one of a front end, an intermediate portion, or a last end of the imaging optics, wherein the at least one refractive lens includes a first lens having a positive refractive power with respect to incident light from an object side and having a convex surface toward the object side, and wherein the meta-lens has negative chromatic aberration with respect to the incident light passing through the first lens.

* * * * *